United States Patent
Danielson et al.

(10) Patent No.: US 8,187,715 B2
(45) Date of Patent: May 29, 2012

(54) RARE-EARTH-CONTAINING GLASS MATERIAL AND SUBSTRATE AND DEVICE COMPRISING SUCH SUBSTRATE

(75) Inventors: Paul Stephen Danielson, Corning, NY (US); Matthew John Dejneka, Corning, NY (US); Adam James Ellison, Painted Post, NY (US); Timothy J Kiczenski, Corning, NY (US)

(73) Assignee: Corning Incorporated, Corning, NY (US)

( * ) Notice: Subject to any disclaimer, the term of this patent is extended or adjusted under 35 U.S.C. 154(b) by 236 days.

(21) Appl. No.: 12/464,423

(22) Filed: May 12, 2009

(65) Prior Publication Data

US 2009/0286091 A1  Nov. 19, 2009

Related U.S. Application Data

(60) Provisional application No. 61/052,772, filed on May 13, 2008.

(51) Int. Cl.
 *B32B 15/00* (2006.01)
 *B32B 17/06* (2006.01)
 *C03C 3/076* (2006.01)

(52) U.S. Cl. ............ 428/432; 428/426; 501/23; 501/55; 501/64; 501/65; 501/66

(58) Field of Classification Search .................. 501/53, 501/55, 64, 65, 66; 428/426, 432
See application file for complete search history.

(56) References Cited

U.S. PATENT DOCUMENTS

| | | | |
|---|---|---|---|
| 6,319,867 B1 | 11/2001 | Chacon et al. | 501/66 |
| 6,555,232 B1 | 4/2003 | Aitken et al. | 428/428 |
| 7,189,672 B2 | 3/2007 | Aitken et al. | 501/63 |
| 2006/0238100 A1* | 10/2006 | Miyata et al. | 313/483 |
| 2007/0042894 A1 | 2/2007 | Aitken et al. | 501/64 |
| 2007/0191207 A1* | 8/2007 | Danielson et al. | 501/66 |

FOREIGN PATENT DOCUMENTS

| | | |
|---|---|---|
| CN | 1445187 | 10/2003 |
| CN | 1522978 | 8/2004 |
| EP | 1321442 | 6/2003 |
| WO | WO2007/095115 | 8/2007 |

* cited by examiner

*Primary Examiner* — Gwendolyn Blackwell
(74) *Attorney, Agent, or Firm* — Siwen Chen (57) ABSTRACT

A rare-earth-containing glass material having a composition, expressed in mole percentages on and oxide basis, comprising:
 $SiO_2$: 66-75
 $Al_2O_3$: 11-17
 $B_2O_3$: 0-4
 MgO: 1-6.5
 CaO: 2-7
 SrO: 0-4
 BaO: 0-4
 $Y_2O_3$: 0-4
 $La_2O_3$: 0-4
 $Y_2O_3 + La_2O_3$: 0.1-4.

The inclusion of $Y_2O_3$ and/or $La_2O_3$ in the composition reduces the T2.3 of the glass thereby allowing higher annealing-point glasses to be produced. The glass is particularly useful for low-temperature polycrystalline silicon-based semiconductor devices.

22 Claims, 4 Drawing Sheets

FIG. 1

Log Viscosity (P)

RARE-EARTH-CONTAINING GLASS MATERIAL AND SUBSTRATE AND DEVICE COMPRISING SUCH SUBSTRATE

CROSS-REFERENCE TO RELATED APPLICATION

This application claims priority to U.S. Provisional Patent Application Ser. No. 61/052,772, filed on May 13, 2008 and entitled "RARE-EARTH-CONTAINING GLASS MATERIAL AND SUBSTRATE AND DEVICE COMPRISING SUCH SUBSTRATE," the content of which is relied upon and incorporated herein by reference in its entirety.

TECHNICAL FIELD

The present invention relates to glass materials, glass substrates comprising such glass materials, and devices comprising such glass substrates. In particular, the present invention relates to rare-earth-containing glass materials, high-precision glass substrates, and devices comprising such glass substrates bearing a layer of semiconductor material such as polycrystalline silicon. The present invention is useful, e.g., in making glass substrates for LCD displays, especially those based on polycrystalline silicon technology.

BACKGROUND

The production of liquid crystal displays such as, for example, active matrix liquid crystal display devices (AMLCDs) is very complex, and the properties of the substrate glass are extremely important. First and foremost, the glass substrates used in the production of AMLCD devices need to have their physical dimensions tightly controlled. The downdraw sheet drawing processes and, in particular, the fusion process described in U.S. Pat. Nos. 3,338,696 and 3,682,609, both to Dockerty, are capable of producing glass sheets that can be used as substrates without requiring costly post-forming finishing operations such as lapping and polishing. Unfortunately, the fusion process places rather severe restrictions on the glass properties, which require relatively high liquidus viscosities.

In the liquid crystal display field, thin film transistors (TFTs) based on poly-crystalline silicon are preferred in certain applications because of their ability to transport electrons more effectively. Poly-crystalline (p-Si) based silicon transistors are characterized as having a higher mobility than those based on amorphous-silicon (a-Si) based transistors. This allows the manufacture of smaller and faster transistors, which ultimately produces brighter and faster displays. In certain other applications, a layer of single-crystalline semiconductor material such as silicon formed on the surface of the glass substrate is even more desirable because the even higher performance of the semiconducting device components based on single-crystalline silicon.

One problem with p-Si and single-crystalline silicon based transistors is that their manufacture requires higher process temperatures than those employed in the manufacture of a-Si transistors. There are multiple steps with temperatures ranging from 450° C. to 750° C. for p-Si, and even higher for single-crystalline silicon, compared to the 400° C. peak temperatures employed in the manufacture of a-Si transistors. At these temperatures, most AMLCD glass substrates undergo a process known as compaction. Compaction, also referred to as thermal stability or dimensional change, is an irreversible dimensional change (shrinkage) in the glass substrate due to changes in the fictive temperature of the glass material. "Fictive temperature" is a concept used to indicate the structural state of a glass. Glass that is cooled quickly from a high-temperature is said to have a higher fictive temperature because of the "frozen in" higher temperature lower density structure. Glass that is cooled more slowly, or that is annealed by holding for a time near its annealing point, is said to have a lower fictive temperature and higher density structure.

The magnitude of compaction depends both on the process by which a glass is made and the viscoelastic properties of the glass. In the float process for producing sheet products from glass, the glass sheet is cooled relatively slowly from the melt and, thus, "freezes in" a comparatively low-temperature structure into the glass. The fusion process, by contrast, results in very rapid quenching of the glass sheet from the melt, and freezes in a comparatively high-temperature structure. As a result, a glass produced by the float process may undergo less compaction when compared to glass produced by the fusion process, since the driving force for compaction is the difference between the fictive temperature and the process temperature experienced by the glass during compaction. Thus, it would be desirable to minimize the level of compaction in a glass substrate that is produced by a downdraw process.

There are two approaches to minimizing compaction in glass. The first is to thermally pretreat the glass to create a fictive temperature similar to the one the glass will experience during the p-Si TFT manufacture. However there are several difficulties with this approach. First, the multiple heating steps employed during the p-Si TFT manufacture create slightly different fictive temperatures in the glass that cannot be fully compensated for by this pretreatment. Second, the thermal stability of the glass becomes closely linked to the details of the p-Si TFT manufacturer, which could mean different pretreatments for different end-users. Finally, pretreatment adds to processing costs and complexity.

Another approach is to slow the kinetics of the compaction response. This can be accomplished by raising the viscosity of the glass. Thus, if the strain point of the glass is much greater than the process temperatures to be encountered (e.g., if the strain point is ~50-100° C. greater than the process temperatures for short exposures), compaction is minimal. The challenge with this approach, however, is the production of high strain point glass that is cost effective because higher strain point glasses normally require higher melting temperatures.

Hence, there remains a need of a glass material possessing high strain points and, thus, good dimensional stability (i.e., low compaction) and with reasonable melting temperatures. Desirably, the glass compositions also possess all of the properties required for downdraw processing, including but not limited to fusion down-draw processing, which is important in the manufacturing of substrates for liquid crystal displays.

The present invention addresses this and other needs.

SUMMARY

Several aspects of the present invention are disclosed herein. It is to be understood that these aspects may or may not overlap with one another. Thus, part of one aspect may fall within the scope of another aspect, and vice versa. Unless indicated to the contrary in the context, the differing aspects shall be considered as overlapping with each other in scope.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa. Unless indicated to the contrary in the context, the differing embodiments shall be considered as overlapping with each other in scope.

According to a first aspect of the present invention, provided is a rare-earth-containing glass material having a composition, expressed in mole percentages on an oxide basis, comprising:

$SiO_2$: 66-75
$Al_2O_3$: 11-17
$B_2O_3$: 0-4
MgO: 1-6.5
CaO: 2-7
SrO: 0-4
BaO: 0-4
$Y_2O_3$: 0-4
$La_2O_3$: 0-4
$Y_2O_3+La_2O_3$: 0.1-4.

In certain embodiments of the first aspect of the present invention, the glass material has a composition comprising $RE_2O_3$ at most 3 mol %, in certain embodiments at most 2 mol %.

In certain embodiments of the first aspect of the present invention, the glass material has a composition comprising $B_2O_3$ at most 2 mol %, in certain embodiments at most 1 mol %, in certain embodiments essentially at 0 mol %.

In certain embodiments of the first aspect of the present invention, the glass material has a composition essentially free of BaO.

In certain embodiments of the first aspect of the present invention, the glass material has a composition comprising 1-4 mol % BaO.

In certain embodiments of the first aspect of the present invention, the glass material has a composition comprising 1-6 mol % MgO, in certain other embodiments from 1-5 mol %, in certain other embodiments from 1-4 mol %.

In certain embodiments of the first aspect of the present invention, the glass material has a composition expressed in mole percentages on an oxide basis, comprising:

$SiO_2$: 67-74
$Al_2O_3$: 12-17
$B_2O_3$: 0-4
MgO: 1-5
CaO: 2-6
SrO: 0-4
BaO: 0-4
$Y_2O_3$: 0-4
$La_2O_3$: 0-4
$Y_2O_3+La_2O_3$: 0.5-4.

In certain embodiments of the first aspect of the present invention, the glass material has a composition comprising:

$SiO_2$: 68-72
$Al_2O_3$: 12-16
$B_2O_3$: 0-4
MgO: 1-5
CaO: 2-6
SrO: 0.1-2
BaO: 1-4
$Y_2O_3$: 0-3
$La_2O_3$: 0-4
$Y_2O_3+La_2O_3$: 0.8-4.

In certain embodiments of the first aspect of the present invention, the glass material has a composition expressed in mole percentages on an oxide basis, comprising:

$SiO_2$: 68-72
$Al_2O_3$: 13-16
$B_2O_3$: 0-4
MgO: 1-5
CaO: 2-6
SrO: 0.1-2
BaO: 1-4
$Y_2O_3$: 0-3
$La_2O_3$: 0-4
$Y_2O_3+La_2O_3$: 14.

In certain embodiments of the first aspect of the present invention, the glass material has a composition comprising:

$SiO_2$: 68-72
$Al_2O_3$: 13-16
$B_2O_3$: 0-2
MgO: 1-5
CaO: 2-6
SrO: 0.1-2
BaO: 1-4
$Y_2O_3$: 0-3
$La_2O_3$: 0-4
$Y_2O_3+La_2O_3$: 1-4.

In certain embodiments of the first aspect of the present invention, the glass material has a composition essentially free of $As_2O_3$ and $Sb_2O_3$.

In certain embodiments of the first aspect of the present invention, the glass material has a composition further comprising:

$TiO_2$: 0-2
ZnO: 0-3.

In certain embodiments of the first aspect of the present invention, the glass material has a composition comprising ZnO and $B_2O_3$, in total, from 0 to 4 mol %.

In certain embodiments of the first aspect of the present invention, the glass material has a composition having a $[R'O]/[Al_2O_3]$ ratio from 0.75 to 1.8, in certain embodiments from 0.75 to 1.5, in certain embodiments from 0.9 to 1.25, in certain embodiments from 1.0 to 1.25, where [R'O] is defined infra.

In certain embodiments of the first aspect of the present invention, the glass material has an annealing point of higher than 790° C., in certain embodiments higher than 800° C., in certain embodiments higher than 805° C., in certain embodiments higher than 810° C., in certain embodiments higher than 815° C., in certain other embodiments higher than 820° C., in certain embodiments higher than 830° C.; still in certain other embodiments higher than 835° C.

In certain embodiments of the first aspect of the present invention, the glass material has a T2.3 lower than 1680° C., in certain embodiments lower than 1660° C., in certain embodiments lower than 1640° C., in certain embodiments lower than 1620° C., in certain embodiments lower than 1600° C., in certain embodiments lower than 1580° C.

In certain embodiments of the first aspect of the present invention, the glass material has a CTE (0-300° C.) lower than $42 \times 10^{-7} K^{-1}$, in certain embodiments lower than $40 \times 10^{-7} K^{-1}$, in certain other embodiments lower than $38 \times 10^{-7} K^{-1}$.

In certain embodiments of the first aspect of the present invention, the glass material has a CTE (0-300° C.) higher than $30 \times 10^{-7} K^{-1}$, in certain embodiments higher than $32 \times 10^{-7} K^{-1}$, in certain embodiments higher than $34 \times 10^{-7} K^{-1}$, in certain other embodiments higher than $35 \times 10^{-7} K^{-1}$.

In certain embodiments of the first aspect of the present invention, the glass material has a density lower than 3.2 $g \cdot cm^{-3}$; in certain embodiments lower than 3.1 $g \cdot cm^{-3}$; in certain embodiments lower than 3.0 $g \cdot cm^{-3}$, in certain embodiments lower than 2.95 $g \cdot cm^{-3}$, in certain embodiments lower than 2.90 $g \cdot cm^{-3}$, in certain embodiments lower than 2.85 g·cm$^{-3}$, in certain other embodiments lower than 2.80 g cm$^{-3}$, in certain other embodiments lower than 2.75 g·cm$^{-3}$, in certain other embodiments lower than 2.70 g·cm$^{-3}$, in certain other embodiments lower than 2.65 g·cm$^{-3}$.

In certain embodiments of the first aspect of the present invention, the glass material has a liquidus temperature lower than 1250° C., in certain embodiments lower than 1230° C., in certain embodiments lower than 1215° C., in certain embodiments lower than 1200° C., in certain embodiments lower than 1190° C., in certain embodiments lower than 1180° C., in certain other embodiments lower than 1170° C., in certain other embodiments lower than 1150° C., in certain other embodiments lower than 1130° C.

In certain embodiments of the first aspect of the present invention, the glass material has a liquidus viscosity greater than 60 kPoise, in certain embodiments greater than 80 kPoise, in certain embodiments greater than 100 kPoise, in certain embodiments greater than 120 kPoise, in certain embodiments greater than 140 kPoise, in certain embodiments greater than 160 kPoise, in certain embodiments greater than 180 kPoise, in certain embodiments greater than 200 kPoise, in certain embodiments greater than 300 kPoise, in certain embodiments greater than 400 kPoise, in certain embodiments greater than 500 kPoise.

According to a second aspect of the present invention, provided is a glass substrate for TFT liquid crystal display, photovoltaic or other opto-electric devices, comprising a glass material according to the first aspect of the present invention and the various embodiments thereof, described summarily supra and in greater detail infra.

In certain embodiments of the second aspect of the present invention, the glass substrate is made by a down-draw process such as a fusion down-draw process, or a slot downdraw process.

In certain embodiments of the second aspect of the present invention, the glass substrate is made by a float process.

According to a third aspect of the present invention, provided is a device comprising a substrate according to the second aspect of the present invention and various embodiments thereof, described summarily supra and in greater detail infra.

In certain embodiments of the third aspect of the present invention, the device comprises a thin film of polycrystalline or single-crystalline semiconductor material such as silicon or a semiconductor device made thereof such as a diode, a transistor, and the like, formed over a surface of the substrate.

In certain embodiments of the third aspect of the present invention, the device comprises a thin film of amorphous silicon or a semiconductor device made thereof such as a diode, a transistor, and the like, formed over a surface of the substrate.

In certain embodiments of the third aspect of the present invention, the device comprises a layer of a material differing from the glass material, such as a semiconductor material, formed by a process including a step at a temperature higher than 350° C., in certain embodiments higher than 400° C., in certain embodiments higher than 450° C., in certain embodiments higher than 500° C., in certain embodiments higher than 550° C., in certain embodiments higher than 600° C., in certain embodiments higher than 650° C., in certain embodiments higher than 700° C., in certain embodiments higher than 750° C.

In certain embodiments of the third aspect of the present invention, the device comprises, over a surface of the substrate, a layer of a material differing from the glass material, such as a semiconductor material, formed by a process comprising a step at a temperature higher than the strain point of the glass material, but lower than the softening point of the glass.

According to a fourth aspect of the present invention, provided is a process for making a glass material according to the first aspect of the present invention and various embodiments described summarily supra and in greater detail infra, comprising:

(i) providing a batch mixture comprising source materials that upon melting transforms into a glass melt having a composition corresponding to the glass material;

(ii) melting the batch mixture to obtain a fluid glass;

(iii) forming a glass sheet from the fluid glass via a down-draw process.

In certain embodiments of the process according to the fourth aspect of the present invention, in step (iii), the down-draw process comprises a fusion process.

In certain embodiments of the process according to the fourth aspect of the present invention, subsequent to step (iii) but prior to the end use of the glass sheet: the as-formed glass is not subjected to a heat treatment at a temperature above T(anneal)—150° C.; in certain embodiments the as-formed glass sheet is not subjected to a heat treatment at a temperature around or higher than the annealing point thereof.

In certain embodiments of the process according to the fourth aspect of the present invention, subsequent to step (iii) but prior to the end use of the glass sheet, the as-formed glass sheet is not subjected to a heat treatment at a temperature higher than 300° C.

Certain embodiments of the various aspects of the present invention have one or more of the following advantages. First, the glass material, due to high annealing point, can be used for high-temperature material processing, enabling them for use in polycrystalline and/or single-crystalline silicon applications. Second, due to the presence of $Y_2O_3$ and/or $La_2O_3$, the temperature of the glass material having a 200 poise temperature (hereinafter T2.3) and high-temperature viscosity of the glass material is lowered compared to the same glass composition without $Y_2O_3$ and $La_2O_3$, widening the melting process window. Further, glass sheets without the need of polishing can be produced via a down-draw process, such as fusion down-draw, from certain embodiments of the glass material of the present invention. Last but not least, the high annealing point of the glass (and hence high low-temperature viscosity) would allow for higher draw rate of the glass in a fusion draw process for making glass sheets, improving the productivity of the manufacture process and equipment.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Unless otherwise indicated, all numbers such as those expressing mole percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a semiconductor material" includes embodiments having two or more such materials, unless the context clearly indicates otherwise.

As used herein, a "mol %" or "mole percent" or "percent by mole" of a component, unless specifically stated to the contrary, is based on the total moles of the composition or article in which the component is included. As used herein, all percentages are by mole unless indicated otherwise.

As used herein, for the convenience of description, RO represents, collectively, MgO, CaO, SrO and BaO. RE$_2$O$_3$ represents, collectively, rare earth oxides (including but not limited to Sc$_2$O$_3$, Y$_2$O$_3$, La$_2$O$_3$, Pr$_2$O$_3$, Nd$_2$O$_3$, Sm$_2$O$_3$, Eu$_2$O$_3$, Gd$_2$O$_3$, Tb$_2$O$_3$, Dy$_2$O$_3$, Ho$_2$O$_3$, Er$_2$O$_3$, Tm$_2$O$_3$, Yb$_2$O$_3$, and Lu$_2$O$_3$). The mole percentage of an oxide XO in the glass composition is denoted as [XO] with the exception that, however, [R'O] represents, the sum total of [RO]+1.5x [RE$_2$O$_3$].

As used herein, T2.3 means the temperature at which the viscosity of the glass having a homogenous composition is 200 poise (20 Pa·s). The liquidus viscosity of the glass is denoted as η(liquidus) in the present disclosure. The liquidus temperature of a glass is denoted as T(liquidus).

As used herein, "formed over a surface" includes, inter alia, embodiments where a device or a layer of material is formed on a surface having direct contact with the surface, as well as embodiments where a device or a layer of material is formed above the surface without directly contacting the surface, such as the surface of a glass substrate. In the latter embodiments, the device or layer of material can be formed in direct contact with an intermediate layer directly abutting the surface.

This invention relates to glass compositions that could allow tighter design rules in low-temperature poly-silicon ("LTPS") applications while allowing the manufacture of the glass with no heavy metal fining agents (such as arsenic or antimony). There are a wide range of compositions currently in production worldwide to be used as substrates for liquid crystal displays, the majority of which are used in amorphous silicon applications. For the higher performing poly-silicon applications, however, there is a much smaller number of glasses compatible with the elevated temperatures of LTPS processing, often in excess of 600° C. Under these conditions most substrates would undergo considerable dimensional change (often referred to as compaction), which is highly undesirable for high-precision display manufacture process. In order to reduce this dimensional change, LTPS substrates have historically employed slower cooling rates (such as the float process) or secondary heat treatments prior to polysilicon deposition (such as annealing). Either of these process steps could provide a glass with a lower temperature structure that is closer to equilibrium with LTPS processing temperatures, thereby reducing the driving force for dimensional change to occur. The problems associated with these processing steps are inferior quality surfaces (in float processes) and poor yields due to surface particles and breakage in secondary heat treatments.

In contrast to either of these process-oriented solutions, a new glass composition having a high annealing point at about 785° C. was developed by Corning Incorporated, New York, U.S.A. This glass composition has been designed to have a higher viscosity in LTPS temperature ranges which drastically slows down structural relaxation in down-stream semiconductor formation processes and thereby reduces the dimensional change. The higher low-temperature (i.e., temperature range of lower than 1000° C.) viscosity compensates for the high-temperature structure set into the "as-drawn" glass due to rapid cooling during the fusion process and avoids the use of costly secondary heat treatments while maintaining a superior surface quality relative to float processes. Nonetheless, this composition requires relatively high process temperatures (melting and fining temperatures, e.g. a T2.3 of about 1675° C.), and uses antimony as a fining agent. Moreover, next-generation LTPS processes (either higher temperatures or tighter design rules) may require a glass substrate with an even higher high-temperature sustainability. This invention is thus made, in certain embodiments, to glasses that further increase the low-temperature viscosity to improve dimensional stability while reducing the process and fining temperatures, which could also allow for the removal the need for antimony as a fining agent (though Sb$_2$O$_3$ may still be present).

These two characteristics are accomplished through the addition of rare earth oxides, specifically yttrium oxide and/or lanthanum oxide, which drastically steepens the viscosity curve, resulting in both higher low-temperature and lower high-temperature viscosities. In certain embodiments, it is desired that the composition is essentially free of alkali metals. The glass contains rare earth oxide and may also contain some amount of boron oxide, zinc oxide, titanium oxide, and other elements required for satisfactory glass manufacturing, such as fining agents, including but not limited to SnO$_2$, CeO$_2$, Fe$_2$O$_3$, halides, and the like.

Certain embodiments of the glass of the present invention desirably has a high annealing point (the temperature corresponding to a glass viscosity of $10^{13.2}$ poises) greater than 790° C. and a T2.3 (temperature corresponding to glass viscosity of 200 Poise) lower than 1680° C. Certain embodiments of the glass of the present invention desirably have the properties suitable for display glass applications. Certain embodiments of the glass of the present invention desirably have the properties suitable for other applications such as photovoltaics. The glasses in this invention meeting these criteria can be used as manufactured by existing sheet forming processes such as a fusion down-draw process, with no need for secondary heat treatments.

Figure 1:
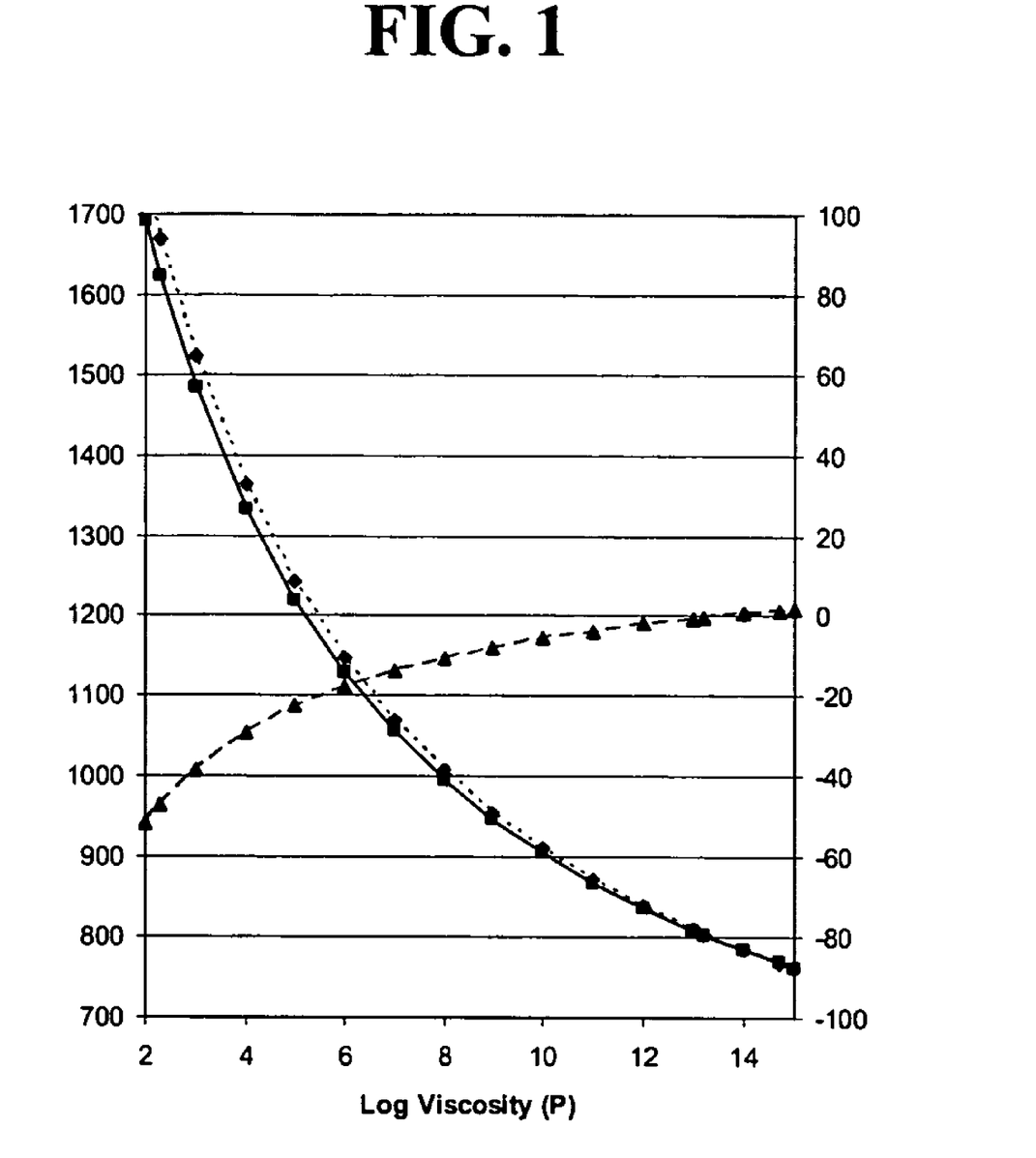
FIG. 1 is a diagram showing the impact of the addition of 1 mol % of $Y_2O_3$ into a glass composition on glass viscosity.

FIG. 1 shows the impact on viscosity of the super-addition of 1 mol % of yttrium oxide to a traditional LTPS glass composition.

Increasing the annealing point of a glass is understood to significantly reduce the dimensional change in a glass in a simple thermal cycle (such as holding the glass at an elevated temperature for a period of time). We have observed a correlation between a higher annealing point and improved compaction performance in a glass sheet and have demonstrated that certain embodiments of the glass of the present invention have better compaction performance than the new glass Corning developed for LTPS mentioned supra.

Desirably, to melt the batched raw materials and fine out the resulting gaseous inclusions in a reasonable and economical period of time in a typical melting and Pt glass delivery system, the T2.3 in the glass melt does not exceed ~1680° C. However, the removal of heavy metal fining agents, such as antimony and arsenic, imposes even tighter constraints. In order to aid in rapid melting and adequate fining without either of these two fining agents, the T2.3 is desired to be lower than 1650° C., to help enhance Stokes fining.

In addition to the melting and fining properties, the glasses are desired to have resistance to devitrification in the fusion draw machine. Devitrification (the formation of a crystalline phase from a homogeneous glass) is quantified by the liquidus temperature (defined as the temperature at which the first crystalline solid is in equilibrium with a melt), which is determined by 72 hour gradient boat measurements. These measurements are conducted with a platinum boat filled with crushed glass cullet placed into a tube furnace with a thermal gradient imposed upon its length. After 72 hours under these conditions, the temperature at which the first crystal is observed is deemed the liquidus temperature, and the liquidus viscosity is the viscosity of the glass corresponding to this temperature. To be compatible with existing fusion draw machines, it is desirable that the liquidus temperature of the glass does not exceed 1250° C. and the corresponding liquidus viscosity is not lower than 60,000 Poise.

The presence of rare earth in the composition, especially $La_2O_3$ and $Y_2O_3$, contributes to the above attributes of the glass material and process of the present invention. Glass materials, without the presence of rare earth oxides, that have annealing points high enough to have desirable compaction often have T2.3 that would make them difficult to melt and fine, especially in existing typical melting and fining facilities. Those glasses that do manage to satisfy both of these requirements tend to have unacceptable liquidus temperatures and/or liquidus viscosities. It was found that, however, glasses containing rare earth oxides of the present invention, however, can easily satisfy all three criteria simultaneously. A super-addition of a rare earth oxide to a typical LTPS composition drastically lowers the T2.3 while having an insignificant effect on the annealing point of the glass. This phenomenon is demonstrated in FIG. 1, which compares two equilibrium viscosity curves: one with and one without 1 mol % $Y_2O_3$. In this figure, curve 1.2 shows the temperature of a glass comprising 1 mol % $Y_2O_3$ as a function of log η, where η is the viscosity in poise. Curve 1.1 shows the temperature of a glass with essentially the same composition except for the absence of $Y_2O_3$ in relation to log η. For curves 1.1 and 1.2, the vertical axis is on the left-hand side of the diagram. Curve 1.3 shows the difference in temperature of these two glass materials at the same viscosity (temperature of the $Y_2O_3$-containing glass minus temperature of the non-$Y_2O_3$-containing glass). The vertical axis for curve 1.3 is indicated on the right-hand side of this diagram.

From FIG. 1, it can be seen that the two curves 1.1 and 1.2 are virtually covariant at viscosities at and above the annealing point while the $Y_2O_3$-containing glass has a T2.3 50° C. lower than the $Y_2O_3$-free glass. In addition to significantly reducing the T2.3 and fining temperatures of the non-$Y_2O_3$-containing glass, the $Y_2O_3$-containing glass also has a substantially lower (25° C.) liquidus temperature and correspondingly higher liquidus viscosity. This example clearly indicates how the utilization of rare earth oxides in the glass material of the present invention can allow a glass composition to satisfy the stringent requirements set forth above.

As discussed above, the present invention is concerned, inter alia, with improved glasses for use as, inter alia, substrates in flat panel displays, e.g., AMLCDs. In particular, the glasses desirably meet the various property requirements of such substrates. The glass material according to certain embodiments of the present invention may be used for other applications, such as the fabrication of photovoltaics. The major components of the glass are $SiO_2$, $Al_2O_3$, and at least two alkaline earth oxides, i.e., at least MgO and CaO and at least one rare earth oxide.

$SiO_2$ serves as the basic glass former of the glasses of the invention. Its concentration should be at least 66 mol % in order to provide the glass with a density and chemical durability suitable for a flat panel display glass, e.g., an AMLCD glass, and a liquidus temperature (liquidus viscosity) which allows the glass to be formed by a downdraw process (e.g., a fusion process).

To be formed by a downdraw process, the glasses desirably have a liquidus viscosity which is greater than or equal to 10000 poises in certain embodiments, more desirably greater than or equal to 20,000 poises in certain other embodiments, more desirably greater than or equal to 50,000 poises in certain other embodiments, more desirably greater than or equal to 60,000 poises in certain other embodiments, more 100,000 poises, more desirably greater than or equal to 150,000 poises, and most desirably greater than or equal to 200,000 poises.

In terms of an upper limit, the $SiO_2$ concentration should be less than or equal to 75 mol % to allow batch materials to be melted using conventional, high volume, melting techniques, e.g., Joule melting in a refractory melter. When the concentration of $SiO_2$ goes above 75 mol %, the T2.3 can be too high for conventional melting processes carried out in conventional melting and delivery systems.

Desirably, the $SiO_2$ concentration is from 67 to 74 mol % in certain embodiments, more desirably from 68 to 72 mol % in certain embodiments. As a result of their $SiO_2$ content, the glasses of the invention can have T2.3 greater than or equal to 1565° C. and less than or equal to 1680° C.

As known in the art, $SiO_2$ is typically introduced in the form of a crushed sand made of alpha quartz, either from loose sand deposits or mined from sandstone or quartzite. While these are commercially available at low cost, other crystalline or amorphous forms of $SiO_2$ can be substituted in part or in whole with little impact on melting behavior. Because molten $SiO_2$ is very viscous and dissolves slowly into alkali-free glass, it is generally advantageous that the sand be crushed so that at least 85% of it passes through a U.S. mesh size of 100, corresponding to mesh opening sizes of about 150 microns. In production, fines may be lofted by batch transfer processes or by air-handling equipment, and to avoid the health hazards this presents it may be desirable to remove the smallest fraction of crushed sand as well.

$Al_2O_3$ is another glass former of the glasses of the invention. An $Al_2O_3$ concentration greater than or equal to 11 mol % provides the glass with a low liquidus temperature and a corresponding high liquidus viscosity. The use of at least 11 mol % $Al_2O_3$ also improves the glass strain point and modulus. In order to achieve a proper melting behavior, the $Al_2O_3$ concentration should be at most 17 mol %. Desirably, the $Al_2O_3$ concentration is from 12 and 17 mol % in certain embodiments, more desirably from 12 to 16 mol % in certain other embodiments, still more desirably from 13 to 16 mol % in certain other embodiments.

$B_2O_3$, when present, is both a glass former and a flux that aids melting and lowers the T2.3. Large amounts of $B_2O_3$, however, lead to reductions in strain point (approximately 10° C. for each 1.0 mol % increase in $B_2O_3$ above 2.0 mol %), modulus, and chemical durability. For glasses for polysilicon substrates or single-crystalline substrates (e.g., a device formed by using the semiconductor-on-insulator technology, such as silicon-on-glass technology, comprising a layer of single-crystalline semiconductor such as silicon on a pristine surface of the glass substrate), high strain point (such as above 750° C.) is an important property. Therefore, in the glasses of the present invention, $B_2O_3$ is kept below or equal to 4 mol %, more desirably below 2 mol % in certain embodiments, still more desirably essentially zero in other embodiments. The low $B_2O_3$ content contributes to enable glass substrates having a strain point higher than 780° C. suitable for polysilicon and single-crystalline applications.

For use in flat panel AMLCD applications based on polysilicon technology and/or single-crystalline silicon technology which typically has a higher semiconductor film forming temperature than those based on amorphous silicon technology, the glasses of substrate desirably have a strain point equal to or greater than 750° C. (more desirably in certain embodiments equal to or greater than 755° C., still more desirably in certain other embodiments equal to or greater than 760° C.), especially if the glass substrate is produced via a forming process utilizing a fast cooling rate which could result in a relatively high fictive temperature. Such high strain point can allow the glass substrate to withstand such high processing temperature without substantial compaction and without the need of a prior annealing step. Further, for AMLCD applications, the glass substrate is desired to have a Young's modulus equal to or greater than $10.0 \times 10^6$ psi ($6.89 \times 10^4$ MPa, 1 MPa=$1 \times 10^6$ Pascal=$1 \times 10^{-3}$ GPa) (more desirably in certain embodiments equal to or greater than $10.3 \times 10^6$ psi ($7.10 \times 10^4$ Mpa or 71.0 GPa); most desirably in certain other embodiments equal to or greater than 85 GPa. The glass materials of the present invention however, typically has a high Young's modulus of at least 78 GPa, in certain embodiments higher than 80 GPa, in certain other embodiments higher than 82 GPa, in certain embodiments higher than 85 GPa. A high strain point is desirable to help prevent panel distortion due to compaction/shrinkage during thermal processing subsequent to manufacturing of the glass. A high Young's modulus is desirable since it reduces the amount of sag exhibited by large glass sheets during shipping and handling. Thus, the high Young's modulus of the glass material according to certain embodiments of the present invention represents another advantage.

In addition to the glass formers ($SiO_2$, $Al_2O_3$, and $B_2O_3$), the glasses of the invention also include at least two alkaline earth oxides, i.e., at least MgO and CaO, and, optionally, SrO and/or BaO. As known in the art, the alkaline earths are typically added as oxides (especially MgO), carbonates (CaO, SrO and BaO), nitrates (CaO, SrO and BaO), and/or hydroxides (all). In the case of MgO and CaO, naturally-occurring minerals that can serve as sources include dolomite ($Ca_xMg_{1-x}CO_3$), magnesite ($MgCO_3$), brucite ($Mg(OH)_2$), talc ($Mg_3S_4O_{10}(OH)_2$), olivine ($Mg_2SiO_4$) and limestone ($CaCO_3$). These natural sources include iron, and so can be used as a means to add this component as well where necessary.

Although not wishing to be bound by any particular theory of operation, it is believed that following aspects of glass chemistry in a RO—$Al_2O_3$—$SiO_2$ glass system essentially free of rare-earth oxides, described in paragraphs A-R below, can be applied to the glass composition of the present invention, mutatis mutandis.

A. In a RO—$Al_2O_3$—$SiO_2$ glass system, the alkaline earth oxides provide the glass containing RO and $Al_2O_3$ with various properties important to melting, fining, forming, and ultimate use. For example, the MgO concentration in the glass and the [RO]/[$Al_2O_3$] ratio, where [$Al_2O_3$] is the mole percent of $Al_2O_3$ and [RO] equals the sum of the mole percentages of MgO, CaO, SrO, and BaO, can have significant impact on the performance of the glass and, in particular, with regard to meltability and fining.

B. As is known in the art, in aluminosilicate glasses, $Al^{3+}$ ions seek to be surrounded by four oxygen ions ($O^{2-}$). One means by which this occurs is traditionally called a charge-balance interaction. A silicon ion ($Si^{4+}$) bonded to four $O^{2-}$ can be thought of as contributing $\frac{1}{4} \times (+4)$ or an incremental charge of +1 towards the bonding requirements of each $O^{2-}$. If one of these oxygen ions is bonded in turn to a 4-fold coordinated $Al^{3+}$, then there is an additional contribution of $\frac{1}{4} \times (+3) = +\frac{3}{4}$ towards the bonding requirements of the $O^{2-}$ ion, for a total of +1¾. The remaining +¼ can be obtained by a nearby +2 cation such as an alkaline earth, e.g., $\frac{1}{8} \times (+2) = +\frac{1}{4}$. The total charge contributed by positively charged ions exactly balances the negative charge of the oxygen ions, and aluminum can remain in 4-fold coordination. The +2 cations that serve in this role are referred to as charge-balancing cations. Provided that the [RO]/[$Al_2O_3$] ratio is 1 or more, it then follows that nearly all aluminum in calcium aluminosilicate glasses is 4-fold coordinated by oxygen. See M Taylor, G E Brown, Structure of mineral glasses: I. The feldspar glasses $NaAlSi_3O_8$, $KAlSi_3O_8$, $CaAl_2Si_2O_8$. *Geochim. Cosmochim Acta* 43:61-75 (1979); P. McMillan, B. Piriou, A Navrotsky, A Raman spectroscopic study of glasses along the joins silica-calcium aluminate, silica-sodium aluminate, and silica-potassium aluminate. *Geochim Cosmochim Acta* 46:2021-2037 (1982); and A Navrotsky, G Peraudeau, P McMillan, J P Coutures, A thermochemical study of glasses and crystals along the joins silica-calcium aluminate and silica-sodium aluminate. *Geochim Cosmochim Acta* 46:2039-2047 (1982). As is also known in the art, the efficacy of charge-balance by +2 cations varies inversely with their size. The usual explanation for this is that small +2 cations polarize oxygen ions and destabilize their bonds with other cations. See K L Geisinger, G V Gibbs, A Navrotsky, A molecular orbital study of bond length and angle variations in framework silicates. *Phys Chem Minerals* 11: 266-285 (1985); and A Navrotsky, K L Geisinger, P McMillan, G V Gibbs, The tetrahedral framework in glasses and melts-inferences from molecular orbital calculations and physical properties. *Phys Chem Minerals* 11:284-298 (1985). The preferred +2 cations in the glasses of the invention are MgO, CaO, SrO, and BaO in order of ionic radius. The $Ca^{2+}$ ion is better at stabilizing aluminum in 4-fold coordination than the $Mg^{2+}$ ion, but not as effective as the $Sr^{2+}$ ion. In the glasses of the present invention, $Ba^{2+}$ and $Sr^{2+}$ will be completely consumed in charge-balancing interactions, followed by $Ca^{2+}$ up to the limit that virtually all $Al^{3+}$ ions are stabilized in 4-fold coordination by $Ca^{2+}$, $Sr^{2+}$ or $Ba^{2+}$. If $Al^{3+}$ ions remain that still require charge-balance, $Mg^{6+}$ ions will be used for this purpose until the remaining $Al^{3+}$ ions are stabilized in 4-fold coordination.

C. The alkaline earth ions that are not used to stabilize aluminum in 4-fold coordination will tend to share oxygen ions with adjacent silicon ions. In this role, the alkaline earths are termed network modifying cations, because they break up the tetrahedral network of Si—O—Si and Si—O—Al bonds. The acceptable composition ranges for the glasses of the invention require all $Sr^{2+}$ and $Ba^{2+}$ to be consumed in charge-balancing roles so the only alkaline earth ions that can be available as network modifying cations are $Ca^{2+}$ and $Mg^{2+}$. In breaking up the network structure of the glass, the modifying cations contribute to reduced viscosity at elevated temperature, thereby facilitating the basic melting process. They also reduce the solubility of gases in the glass, thereby reducing the possibility of bubble nucleation and growth at high temperature. Further, they attack silica particles in the batch materials, causing them to be rapidly incorporated into a homogeneous melt. Finally, and most important for the glasses of the invention, they can reduce the stability of crystalline silica (e.g., cristobalite, stabilizing the liquid and thereby increasing the viscosity at which a crystal first appears on cooling.

Figure 2:
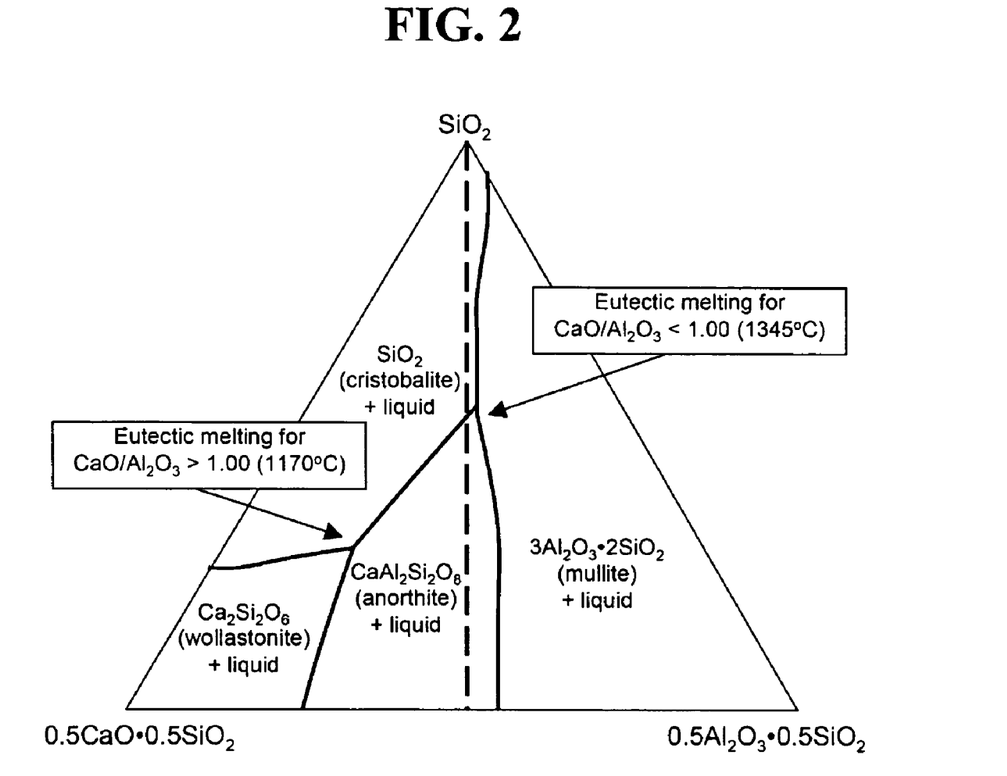
FIG. 2 is a phase diagram of a SiO$_2$—CaO—Al$_2$O$_3$ material system.

D. To understand this last role, i.e., the role of reducing the stability of crystalline silica, it is useful to consider the liquidus phase diagram of the $CaO$—$Al_2O_3$—$SiO_2$ system as depicted in FIG. 2 (data used to prepare this figure are from E M Levin, C R Robbins, H F McMurdie, *Phase Diagrams for Ceramists*. The American Ceramic Society, Inc., Columbus, Ohio (1964), p. 219, converted to mole percent). The curves running through the middle of the diagram denote boundaries in composition space across which the crystal in equilibrium with a liquid changes its identity. At the top of the figure is cristobalite, a crystalline polymorph of $SiO_2$. To the lower right is mullite, approximately $3Al_2O_3$-$2SiO_2$, an aluminosilicate containing aluminum in 4-, 5- and 6-fold coordination. In the lower middle of the diagram is the calcium aluminosilicate anorthite, $CaAl_2Si_2O_8$, in which the $CaO/Al_2O_3$ ratio is 1.0 and all $Al^{3+}$ ions are 4-fold coordinated by oxygen. The phase in the lower left is wollastonite, $Ca_2Si_2O_6$, in which all $Si^{4+}$ ions are 4-fold coordinated by oxygen, all $Ca^{2+}$ ions are 6-fold coordinated by oxygen, and at least some of the oxygen ions are shared between $Ca^{2+}$ and $Si^{4+}$ ions. The vertical line running through the middle of the triangle denotes compositions for which the $CaO/Al_2O_3$ ratio is exactly 1.0. In each of these regions, the crystal in question is in equilibrium with a molten glass, and the region of equilibrium between liquid and a particular crystal is referred to as the liquidus phase field of the crystal.

E. Where two liquidus phase fields intersect, the curve indicating the intersection is called a cotectic, and where three phase fields intersect, the point at which the fields converge is referred to as a eutectic. Eutectics are locations where three crystalline phases simultaneously coexist with a liquid. They are, by definition, local minima in the melting temperature of the particular crystalline assemblage, and therefore are the compositions for which the liquid is most stable relative to any one or combination of the three crystalline phases. Two eutectics are seen in FIG. 2. The first, between cristobalite, anorthite and mullite (right-hand side) is a single melt down to 1345° C., at which point the three crystalline phases simultaneously come into equilibrium with the liquid. The second, between wollastonite, anorthite and cristobalite, is a single melt down to 1170° C., at which point those three phases simultaneously come into equilibrium with the liquid.

F. Were a crystalline assemblage of wollastonite, cristobalite and anorthite heated up from room temperature, the first appearance of a liquid would be at 1170° C., and the composition of the liquid would be equivalent to that of the corresponding eutectic composition. Likewise, were a crystalline assemblage of anorthite, mullite and cristobalite heated up from room temperature, the first appearance of a liquid would be at 1345° C. and the composition of the liquid would be that of the corresponding eutectic between these phases. Between these two eutectics, temperatures increase monotonically to the line denoting $[CaO]/[Al_2O_3]=1.0$, where [CaO] and $[Al_2O_3]$ stand for the mole percentages of CaO and $Al_2O_3$, respectively. This line denotes a thermal maximum in RO—$Al_2O_3$—$SiO_2$ systems, for R═Ca, Sr and Ba. In other words, (Ca, Sr, Ba)O—$Al_2O_3$—$SiO_2$ compositions to the $Al_2O_3$-rich side of the (Ca, Sr, Ba)O/$Al_2O_3$=1 line will melt at the [alkaline earth aluminosilicate]-mullite-cristobalite eutectic composition, and are thermodynamically hindered from melting at the [alkaline earth silicate]-[alkaline earth aluminosilicate]-cristobalite side of the phase diagram.

Figure 3:
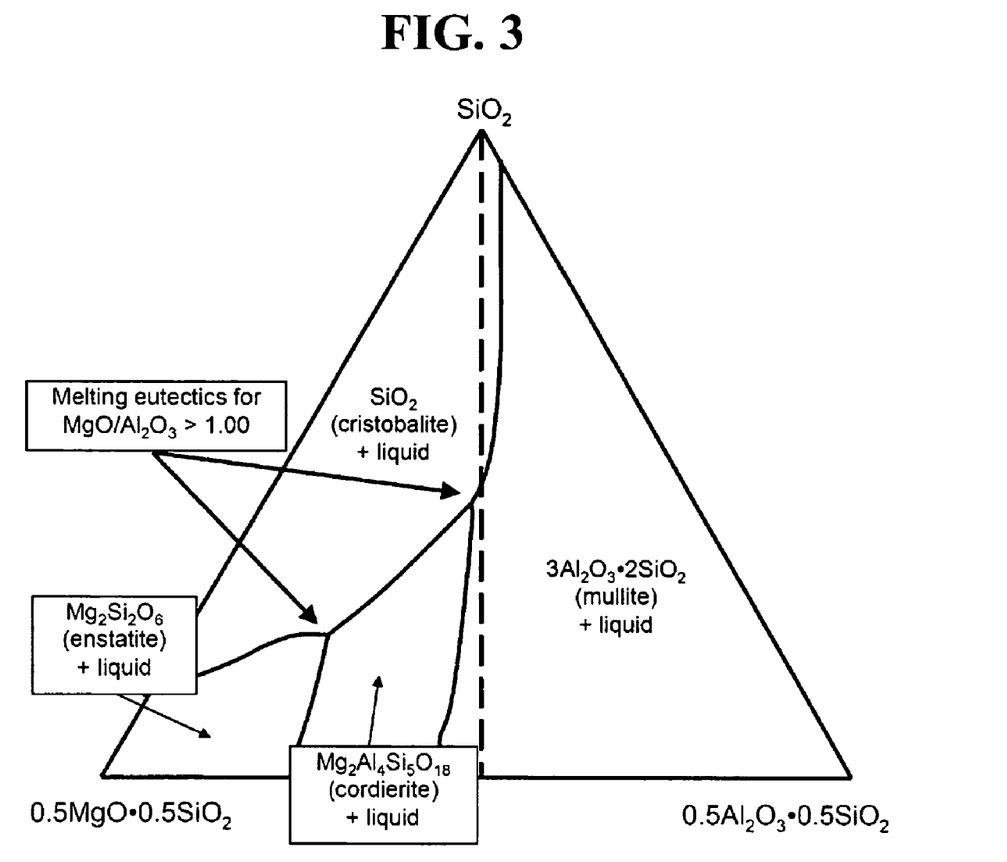
FIG. 3 is a phase diagram of a SiO$_2$—MgO—Al$_2$O$_3$ material system.

G. FIG. 3 shows the liquidus phase diagram of the MgO—$Al_2O_3$—$SiO_2$ system (data used to prepare this figure are from E M Levin, C R Robbins, H F McMurdie, *Phase Diagrams for Ceramists*. The American Ceramic Society, Inc., Columbus, Ohio (1964), p. 246, converted to mole percent). This system is unique among RO—$Al_2O_3$—$SiO_2$ systems in that the magnesium aluminosilicate (cordierite)-mullite-cristobalite eutectic composition has an $[RO]/[Al_2O_3]$ ratio slightly greater than 1. Unlike the other RO—$Al_2O_3$—$SiO_2$ tertiary systems, initial melting of high-silica compositions in the magnesium-based system will thus tend to occur at eutectics with $[RO]/[Al_2O_3]>1.00$. Another point of considerable importance is that the eutectics in question are at much lower silica concentrations than any of the other RO—$Al_2O_3$—$SiO_2$ tertiary systems. Therefore, the lowest liquidus temperatures will be found at comparatively low silica concentrations in the MgO—$Al_2O_3$—$SiO_2$ system compared to the other RO—$Al_2O_3$—$SiO_2$ tertiary systems.

H. For the purposes of the glasses of the invention, the most important consequences of the compositions of early-stage melts pertain to gas solubilities and the appearance of gaseous inclusions in the glass. The solubility of gases is comparatively high in aluminum-rich glasses and falls steeply as the $[RO]/[Al_2O_3]$ ratio increases beyond 1.00 in a RO—$Al_2O_3$—$SiO_2$ glass system. Furthermore, silica is the last component to dissolve during melting, and as it does so the solubility of gas decreases considerably. In RO-rich systems, silica dissolution occurs at a comparatively low temperature, thus further inhibiting initial gas solubility. The net impact of this is that RO-rich glasses have low initial gas solubility, and the solubility actually increases as melting proceeds, whereas $Al_2O_3$-rich glasses have very high initial solubility, but it decreases as melting proceeds. As solubility decreases, gas is forced out of the glass and into bubbles. The surfaces of partially-reacted silica particles serve as effective nucleation sites for these bubbles, and help keep them in the body of the glass.

I. $B_2O_3$ does not participate significantly in any of the binary or ternary aluminosilicate crystals nor in $SiO_2$, and as a consequence its main impact is to decrease liquidus temperature through simple dilution. The main result is that for a given point on the liquidus surface of, for example, the CaO—$Al_2O_3$—$SiO_2$ system, the liquidus temperatures will decrease with addition of $B_2O_3$. It is found empirically in high silica liquids that the impact of $B_2O_3$ on liquidus temperatures is about twenty (20) degrees Centigrade per mol %. As an example, the temperature of the anorthite-cristobalite-mullite eutectic (on the $Al_2O_3$-rich side of FIG. 2) decreases from 1345° C. to about 1145° C. when it is diluted by 10 mol % $B_2O_3$. The impact of dilution on liquidus temperatures is commonly referred to as freezing point depression. Unfortunately $B_2O_3$ has a deleterious effect on strain point, so its concentration should be minimized.

J. A surprising result of composition investigations in AMLCD-type glass compositions is that the substitution of 1-3 mol % MgO for CaO in the CaO—$Al_2O_3$—$SiO_2$ system causes an abrupt shift in the position of the anothite-mullite-cristobalite liquidus to approximately the same position as the cordierite-mullite-cristobalite liquidus in the MgO—$Al_2O_3$—$SiO_2$ system. As a consequence, the addition of MgO not only forces all initial melting to the RO-rich side of the phase diagram, but also produces local minima in liquidus temperatures below those that might be expected from either the MgO- or CaO-based systems alone. The former follows from the discussion above concerning the MgO—$Al_2O_3$—$SiO_2$ system. The latter arises because the addition of a suitably small amount of any oxide will initially reduce liquidus temperatures via freezing point depression. Therefore, while intuitively one would anticipate an increase in liquidus temperatures because of the high temperatures in the ternary systems, i.e., systems having only MgO or CaO, one in fact obtains a decrease from about 1-3 mol %, followed by increasing liquidus temperatures thereafter. Since viscosity is not significantly impacted by the substitution of MgO for CaO, the net result of the decreasing liquidus temperature is an increase in liquidus viscosity. High liquidus viscosities are a prerequisite for precision sheet downdraw processes used to convert molten glass into sheet suitable for AMLCD applications.

K. Previously, it was believed that MgO concentrations equal to or greater than 1 mol % raised liquidus temperatures (lowered liquidus viscosities), thereby compromising high viscosity forming processes, such as, downdraw processes, e.g., fusion processes. However, as discussed above and illustrated by the examples presented below, it has been found that higher levels of MgO can be used, provided that simultaneously, the $[RO]/[Al_2O_3]$ ratio and $SiO_2$ concentration are carefully controlled as described above.

L. Thus, in sum, the foregoing considerations show that of the alkaline earth oxides, MgO is particularly important with regard to melting and fining. In addition, relative to the other alkaline earth oxides, the presence of MgO results in lower density and CTE, and a higher chemical durability, strain point, and modulus.

M. In terms of concentrations, MgO should be greater than or equal to 1.0 mol % in order to achieve the various benefits associated with MgO described above. At concentrations greater than 6.0 mol %, even with control of the $[RO]/[Al_2O_3]$ ratio and the $SiO_2$ concentration, the liquidus temperature rises and liquidus viscosity falls such that forming the glass using a high viscosity forming process (e.g., a fusion process) is compromised. In certain embodiments, it is desired that the MgO concentration is from 1.0 to 5.0 mol %.

N. CaO is essential to producing low liquidus temperatures (high liquidus viscosities), high strain points and moduli, and CTE's in the most desired ranges for flat panel applications, specifically, AMLCD applications. It also contributes favorably to chemical durability, and compared to other alkaline earth oxides it is relatively inexpensive as a batch material. Accordingly, the CaO concentration needs to be greater than or equal to 2.0 mol %. However, at high concentrations, CaO increases density and CTE. Accordingly, the CaO concentration of the glasses of the invention is less than or equal to 7.0 mol %. In certain embodiments, the CaO concentration is desirably from 2.0 to 6.0 mol %.

O. The remaining alkaline earth oxides—SrO and BaO—can both contribute to low liquidus temperatures (high liquidus viscosities) and thus the glasses of the invention will typically contain at least one of these oxides. However, both oxides increase CTE and density and lower modulus and strain point compared to MgO and CaO. Between SrO and BaO, BaO generally has more adverse effects on glass properties than SrO. Also, in terms of producing an environmentally friendly "green" product, minimizing or eliminating barium is considered preferable since barium is one of the listed metals in the Resources Conservation and Recovery Act (RCRA) and is therefore classified by the US EPA as hazardous. It is thus desirable to keep barium at as low a level as possible for the purposes of making an environmentally-friendly glass. However, the same fining characteristics will be obtained when barium oxide (BaO) is included as part of the overall RO concentration of a glass. That is, when the ratio $[RO]/[Al_2O_3]<1$, bubbles will form at a late stage in melting and remain trapped in the glass, whereas when $[RO]/[Al_2O_3] \geq 1$, gas will be eliminated at an early stage, producing fewer inclusions. Therefore, while the in certain embodiments it is desirable the composition is substantially free of barium, the most general embodiment of the invention includes barium as well as other alkaline earth cations.

P. When used, barium can often help reduce liquidus temperatures, albeit generally at the expense of density and coefficient of thermal expansion. If the concentration of barium is played off against other alkaline earths in the glass, particularly strontium, it is possible to obtain properties within the relatively narrow confines that nevertheless contain >0.1 mol % BaO. Insofar as the physical properties and desired fining behavior are concerned, low concentrations of barium (i.e., concentrations that are less than or equal to 4.0 mol %) do not result in an unacceptable penalty, and thus there is no necessary reason to exclude barium from the glass.

Q. To summarize, although the BaO concentration in the glasses of the invention can be as high as 4.0 mol %, it is desirably less than or equal to 3.0 mol % in certain embodiments, more desirably, less than or equal to 0.1 mol % in certain other embodiments, and still more desirably, less than 0.05 mol % (referred to herein as being "substantially free of barium") in certain other embodiments.

R. Strontium suffers from none of the toxic characteristics of barium and therefore AMLCD glasses containing strontium, but not barium, arsenic, or antimony, are perceived as being "super green." The SrO concentration of the glasses of the invention is less than or equal to 3.0 mol %. The SrO concentration will normally be greater than the BaO concentration in certain embodiments. The sum of the SrO and BaO concentrations can be greater than or equal to 0.4 mol %, primarily to provide a sufficiently high liquidus viscosity so that the glass can be formed a downdraw process.

Figure 4:
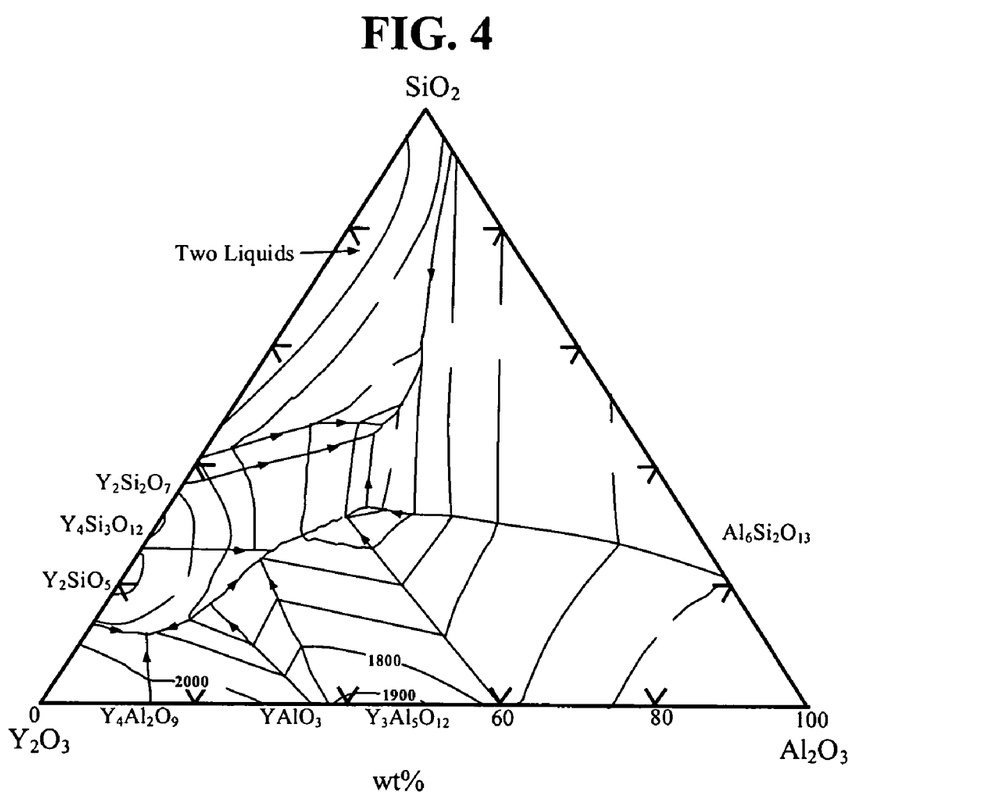
FIG. 4 is a phase diagram of a SiO$_2$—Y$_2$O$_3$—Al$_2$O$_3$ material system.

Rare earth oxides such as $Y_2O_3$ do not form any ternary $RE_2O_3$—$Al_2O_3$—$SiO_2$ phases, unlike the alkaline earth aluminosilicates, hence the minimum liquidus of the system is near the middle of the ternary as shown in FIG. 4. Thus rare earth oxides can be used to suppress the liquidus temperatures of alkaline earth aluminosilicates by suppressing the activity of alkaline earth aluminosilicate crystal phases like cordierite, anorthite, and celsian. In addition, rare earth oxides such as $La_2O_3$ and $Y_2O_3$ steepen the viscosity curve of the melt relative to the alkaline earth oxides, which simultaneously increases the anneal and strain points while decreasing the T2.3 temperature. This enables attainment of glasses with annealing points up to 840° C. while keeping T2.3 less than 1680° C. Rare earth oxides also tend to increase elastic modulus to lower sag of the glass during processing. They also increase density and expansion, so their concentration should not be excessive. It is believed that low amounts of rare earth oxides are incorporated into the glass structure in a manner similar to the alkaline earth oxides in a RO—$Al_2O_3$—$SiO_2$ glass system. Therefore, the importance of $[RO]/[Al_2O_3]$ in a RO—$Al_2O_3$—$SiO_2$ glass system absent rare earth oxides can be extended to that of $[R'O]/[Al_2O_3]$ in the glass compositions of the present invention, hence the significance of the ranges of [R'O]/$Al_2O_3$ in the glass materials of the present invention as described supra. Additionally, the presence of a small amount of rare earth oxides, as in the present invention, does not alter the roles of $Al_2O_3$, $B_2O_3$, MgO, CaO, SrO, and BaO as discussed above, making the above discussion valid in both rare earth oxide-containing and rare earth oxide-free glasses.

In addition to the above components, the glasses of the invention can include various other oxides to adjust various physical, melting, fining, and forming attributes of the glasses. Examples of such other oxides include, but are not limited to, $TiO_2$, MnO, ZnO, $Nb_2O_5$, $MoO_3$, $Ta_2O_5$, $WO_3$, and $CeO_2$. The amount of each of these oxides should be less than or equal to 2.0 mol %, and their total combined concentration should be less than or equal to 5.0 mol %. The glasses of the invention will also include various contaminants associated with batch materials and/or introduced into the glass by the melting, fining, and/or forming equipment used to produce the glass (e.g., $ZrO_2$).

The glasses of the invention will also normally contain some alkali as contaminants, in particular, lithium (Li), sodium (Na), and potassium (K). However, for AMLCD applications, the alkali levels need to be kept below or at most equal to 0.1 mol % $R_2O$ (R=Li, Na, K) to avoid having a negative impact on thin film transistor (TFT) performance through diffusion of alkali ions from the glass into the silicon of the TFT. As used herein, a "glass that is substantially free of alkalis" (also known as an "alkali-free glass") is a glass having a total alkali concentration expressed as $R_2O$ which is less than or equal to 0.1 mol %, where the total alkali concentration is the sum of the $Na_2O$, $K_2O$, and $Li_2O$ concentrations. Desirably the total alkali concentration is less than or equal to 0.07 mol % in certain embodiments.

The glass materials of the present invention, due to their high strain point, relatively low T2.3, are especially advantageous for LCD glass substrates, especially those require a relatively high processing temperature, such as those based on low-temperature polysilicon or single-crystalline technologies.

Thus, according to a second aspect of the present invention, provided is a glass substrate for TFT liquid crystal display, photovoltaic or other opto-electric devices, comprising a glass material according to the first aspect of the present invention and the various embodiments thereof, described supra. In certain embodiments of the second aspect of the present invention, the glass substrate can be advantageously made by a down-draw process such as a fusion down-draw process, or a slot down-draw process, or a float process.

According to a third aspect of the present invention, provided is a device comprising a substrate according to the second aspect of the present invention and various embodiments thereof, described supra. In certain embodiments of the third aspect of the present invention, the device comprises a thin film of polycrystalline or single-crystalline semiconductor material such as silicon or a semiconductor device made thereof such as a diode, a transistor, and the like, formed over a surface of the substrate. In certain embodiments of the third aspect of the present invention, the device comprises a thin film of amorphous silicon or a semiconductor device made thereof such as a diode, a transistor, and the like, formed over a surface of the substrate. In certain embodiments of the third aspect of the present invention, the device comprises a layer of a material differing from the glass material, such as a semiconductor material, formed by a process including a step at a temperature higher than 350° C., in certain embodiments higher than 400° C., in certain embodiments higher than 450° C., in certain embodiments higher than 500° C., in certain embodiments higher than 550° C., in certain embodiments higher than 600° C., in certain embodiments higher than 650° C., in certain embodiments higher than 700° C., in certain embodiments higher than 750° C. In certain embodiments of the third aspect of the present invention, the device comprises, over a surface of the substrate, a layer of a material differing from the glass material, such as a semiconductor material, formed by a process comprising a step at a temperature higher than the strain point of the glass material, but lower than the softening point of the glass.

One having ordinary skill in the art of thin film semiconductor technology understands how to fabricate a thin film of polisilicon or other semiconductor material on the surface of a glass substrate, such as a glass substrate according to the present invention, and to make semiconductor devices such as transistors from the thin film of semiconductor materials. More recently, intrinsic and doped polysilicon is being used in large-area electronics as the active and/or doped layers in thin-film transistors. Although it can be deposited by LPCVD, plasma-enhanced chemical vapour deposition (PECVD), or solid-phase crystallization (SPC) of amorphous silicon in certain processing regimes, these processes still require relatively high temperatures of at least 300° C. These temperatures make deposition of polysilicon possible for glass substrates but not for plastic substrates. The drive to deposit polycrystalline silicon or poly-Si on plastic substrates is powered by the desire to be able to manufacture digital displays on flexible screens. Therefore, a relatively new technique called laser crystallization has been devised to crystallize a precursor amorphous silicon (a-Si) material on a plastic substrate without melting or damaging the plastic. Short, high-intensity ultraviolet laser pulses are used to heat the deposited a-Si material to above the melting point of silicon, without melting the entire substrate. The molten silicon will then crystallize as it cools. By precisely controlling the temperature gradients, researchers have been able to grow very large grains, of up to hundreds of micrometers in size in the extreme case, although grain sizes of 10 nanometers to 1 micrometer are also common. In order to create devices on polysilicon over large-areas however, a crystal grain size smaller than the device feature size is needed for homogeneity of the devices.

One major difference between polysilicon and a-Si is that the mobility of the charge carriers can be orders of magnitude larger and the material also shows greater stability under electric field and light-induced stress. This allows more complex, high-speed circuity to be created on the glass substrate along with the a-Si devices, which are still needed for their low-leakage characteristics. When polysilicon and a-Si devices are used in the same process this is called hybrid processing. A complete polysilicon active layer process is also used in some cases where a small pixel size is required, such as in projection displays.

The process for forming a single-crystalline semiconductor material is disclosed in, e.g., WO05/029576 published on Mar. 31, 2005 and entitled "GLASS-BASED SOI STRUCTURES," the relevant parts thereof are incorporated herein by reference in their entirety.

According to a fourth aspect of the present invention, provided is a process for making a glass material according to the first aspect of the present invention and various embodiments described summarily supra and in greater detail infra, comprising:

(i) providing a batch mixture comprising source materials that upon melting transforms into a glass melt having a composition corresponding to the glass material;

(ii) melting the batch mixture to obtain a fluid glass;

(iii) forming a glass sheet from the fluid glass via a down-draw process.

In certain embodiments of the process according to the fourth aspect of the present invention, in step (iii), the down-draw process comprises a fusion process.

In certain embodiments of the process according to the fourth aspect of the present invention, subsequent to step (iii) but prior to the end use of the glass sheet: the as-formed glass is not subjected to a heat treatment at a temperature above T(anneal)—150° C.; in certain embodiments the as-formed glass sheet is not subjected to a heat treatment at a temperature around or higher than the annealing point thereof.

In certain embodiments of the process according to the fourth aspect of the present invention, subsequent to step (iii) but prior to the end use of the glass sheet, the as-formed glass sheet is not subjected to a heat treatment at a temperature higher than 300° C. These embodiments take advantage of the high anneal point of the glass material of the present invention, which allows for the direct use of the glass substrates in a high-temperature subsequent step without the need of an extra annealing step to reduce the compaction that such process would otherwise bring about to the glass substrate had the glass substrate had a significantly lower annealing point.

The invention is further illustrated by the following examples, which are meant to be illustrative, and not in any way limiting, to the claimed invention.

EXAMPLES

TABLES I-V lists examples of the glasses of the in terms of mole percents which are either calculated on an oxide basis from the glass batches. TABLES I-V also lists various physical properties for these glasses, the units for these properties are provided in the tables. Example Nos. 1-56 were actual glass compositions melted in crucibles and the property data thereof were measured. Examples 57-59 are hypothetical examples with predicted properties listed in TABLE V. It is believed, according to the accumulated experiences by the inventors, that the predicted properties should be a close approximation of the real measured properties thereof.

Inasmuch as the sum of the individual constituents totals or very closely approximates 100, for all practical purposes the reported values may be deemed to represent mole percent.

The actual batch ingredients may comprise any materials, either oxides, or other compounds, which, when melted together with the other batch components, will be converted into the desired oxide in the proper proportions. For example, $SrCO_3$ and $CaCO_3$ can provide the source of SrO and CaO, respectively.

The specific batch ingredients used to prepare the glasses of TABLE I were fine sand, alumina, boric acid, magnesium oxide, limestone, lanthanum oxide, yttrium oxide, barium carbonate or barium nitrate, strontium carbonate or strontium nitrate, zinc oxide, and tin oxide.

The glass properties set forth in TABLE I were determined in accordance with techniques conventional in the glass art. Thus, the linear coefficient of thermal expansion (CTE) over the temperature range 0-300° C. is expressed in terms of $\times 10^{-7} K^{-1}$. and the strain point is expressed in terms of ° C. The density in terms of grams/cm$^3$ was measured via the Archimedes method (ASTM C693). The T2.3 in terms of ° C. (defined as the temperature at which the glass melt demonstrates a viscosity of 200 poises) was calculated employing a Fulcher equation fit to high temperature viscosity data measured via rotating cylinders viscometry (ASTM C965-81). The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity in poises was determined from the liquidus temperature and the coefficients of the Fulcher equation. Young's modulus values in terms of Mpsi were determined using a resonant ultrasonic spectroscopy technique of the general type set forth in ASTM E1875-00e1.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 73.96 | 74.46 | 73.45 | 74.01 | 71.31 | 72.87 | 73.45 | 71.32 | 72.11 | 71.60 | 71.10 | 71.10 |
| $Al_2O_3$ | 13.29 | 13.04 | 13.56 | 13.22 | 14.53 | 13.89 | 13.56 | 14.53 | 14.21 | 13.80 | 14.60 | 14.60 |
| $B_2O_3$ | 0.00 | 0.00 | 0.00 | 0.00 | 0.00 | 0.00 | 0.00 | 0.00 | 0.00 | 0.00 | 0.00 | 0.00 |
| MgO | 1.35 | 1.33 | 1.38 | 1.59 | 2.75 | 1.84 | 1.37 | 2.75 | 2.28 | 3.17 | 2.77 | 2.77 |
| CaO | 5.76 | 5.65 | 5.87 | 5.38 | 4.43 | 5.40 | 5.87 | 4.44 | 4.91 | 4.70 | 4.45 | 4.45 |
| SrO | 0.16 | 0.16 | 0.16 | 0.19 | 0.31 | 0.20 | 0.16 | 0.31 | 0.26 | 1.24 | 0.31 | 0.31 |
| BaO | 3.44 | 3.37 | 3.50 | 3.26 | 2.99 | 3.33 | 3.00 | 2.99 | 3.16 | 3.00 | 3.00 | 3.00 |
| $Y_2O_3$ | 0.00 | 0.00 | 0.00 | 0.00 | 1.00 | 0.00 | 0.00 | 1.00 | 0.00 | 1.42 | 1.00 | 1.00 |
| $La_2O_3$ | 1.77 | 1.74 | 1.81 | 2.08 | 2.60 | 2.40 | 1.80 | 2.61 | 3.00 | 0.96 | 2.61 | 2.61 |
| $SnO_2$ | 0.19 | 0.19 | 0.20 | 0.19 | 0.00 | 0.00 | 0.20 | 0.00 | 0.00 | 0.07 | 0.05 | 0.05 |
| ZnO | 0.00 | 0.00 | 0.00 | 0.00 | 0.00 | 0.00 | 0.51 | 0.00 | 0.00 | 0.00 | 0.00 | 0.00 |
| $ZrO_2$ | 0.00 | 0.00 | 0.00 | 0.00 | 0.00 | 0.00 | 0.00 | 0.00 | 0.00 | 0.03 | 0.05 | 0.05 |
| $Fe_2O_3$ | 0.01 | 0.01 | 0.01 | 0.01 | 0.01 | 0.01 | 0.01 | 0.01 | 0.01 | 0.02 | 0.02 | 0.02 |
| $Na_2O$ | 0.05 | 0.05 | 0.05 | 0.05 | 0.05 | 0.06 | 0.05 | 0.05 | 0.05 | 0.06 | 0.05 | 0.05 |
| Total | 99.97 | 99.98 | 99.98 | 99.98 | 99.98 | 100.00 | 99.99 | 100.00 | 100.00 | 100.07 | 100.01 | 100.01 |
| [$RE_2O_3$] | 1.77 | 1.74 | 1.81 | 2.08 | 3.60 | 2.40 | 1.80 | 3.60 | 3.00 | 2.38 | 3.61 | 3.61 |
| [RO] | 10.70 | 10.50 | 10.91 | 10.42 | 10.48 | 10.77 | 10.41 | 10.49 | 10.62 | 12.11 | 10.53 | 10.53 |
| [R'O] | 13.36 | 13.10 | 13.62 | 13.53 | 15.88 | 14.38 | 13.11 | 15.90 | 15.12 | 15.68 | 15.95 | 15.95 |
| [RO]/[$Al_2O_3$] | 0.81 | 0.81 | 0.80 | 0.79 | 0.72 | 0.78 | 0.77 | 0.72 | 0.75 | 0.88 | 0.72 | 0.72 |
| [R'O]/[$Al_2O_3$] | 1.01 | 1.00 | 1.00 | 1.02 | 1.09 | 1.04 | 0.97 | 1.09 | 1.06 | 1.14 | 1.09 | 1.09 |

TABLE I-continued

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| CTE ($\times 10^{-7}$ K$^{-1}$) | — | — | — | — | — | — | — | — | — | 37.4 | 37.8 | 38.1 |
| Strain Point (° C.) | 790 | 790 | 789 | 787 | 786 | 785 | 784 | 783 | 783 | 782 | 782 | 782 |
| Annealing Point (° C.) | 841 | 841 | 839 | 838 | 834 | 835 | 834 | 832 | 832 | 834 | 833 | 833 |
| Softening point (° C.) | 1056 | 1074 | 1032 | 1070 | 1042 | 1053 | 1062 | 1044 | 1044 | 1060 | 1050 | 1060 |
| Logη (liquidus) (° C.) | 5.64 | 5.66 | 5.40 | 5.81 | 5.60 | 5.25 | 5.59 | 5.63 | 5.50 | 5.34 | 5.32 | 5.46 |
| T2.3 (° C.) | 1679 | 1688 | 1661 | 1664 | 1598 | 1647 | 1662 | 1599 | 1622 | 1639 | 1604 | 1603 |
| T (liquidus) (° C.) | 1210 | 1210 | 1220 | 1190 | 1175 | 1225 | 1200 | 1170 | 1190 | 1210 | 1200 | 1185 |
| Density@ 20° C. (g · cm$^{-3}$) | 2.725 | 2.719 | 2.737 | 2.743 | | | 2.728 | | | 2.740 | 2.840 | 2.840 |
| Young's modulus (GPa) | 85.02 | 84.44 | | 84.92 | 88.12 | 84.92 | 85.22 | | 85.97 | 87.50 | 87.50 | 88.20 |

TABLE II

| | Example No. | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| SiO$_2$ | 72.98 | 71.31 | 71.60 | 71.60 | 71.50 | 73.44 | 71.62 | 70.80 | 70.50 | 71.10 | 72.22 | 71.60 |
| Al$_2$O$_3$ | 13.75 | 14.53 | 13.80 | 13.80 | 14.37 | 13.55 | 13.76 | 14.50 | 14.50 | 13.70 | 13.28 | 13.80 |
| B$_2$O$_3$ | 0.00 | 0.00 | 0.00 | 0.00 | 0.00 | 0.00 | 0.00 | 0.00 | 0.52 | 0.60 | 0.00 | 0.00 |
| MgO | 1.65 | 2.76 | 3.17 | 2.93 | 2.48 | 1.38 | 3.15 | 2.76 | 2.96 | 3.15 | 3.14 | 3.18 |
| CaO | 5.58 | 4.44 | 4.70 | 4.30 | 4.73 | 5.87 | 4.71 | 4.44 | 4.83 | 4.67 | 4.70 | 4.70 |
| SrO | 0.19 | 0.31 | 1.24 | 1.99 | 0.29 | 0.16 | 1.24 | 0.31 | 0.53 | 1.23 | 1.24 | 1.24 |
| BaO | 2.90 | 2.99 | 3.00 | 2.90 | 3.10 | 2.50 | 2.99 | 2.99 | 2.99 | 2.98 | 2.56 | 3.00 |
| Y$_2$O$_3$ | 0.00 | 0.00 | 1.42 | 1.42 | 0.00 | 0.00 | 1.42 | 1.74 | 1.15 | 1.41 | 1.37 | 0.00 |
| La$_2$O$_3$ | 2.16 | 3.60 | 0.96 | 0.96 | 3.25 | 1.80 | 0.96 | 1.86 | 1.89 | 0.95 | 0.93 | 2.37 |
| SnO$_2$ | 0.20 | 0.00 | 0.07 | 0.07 | 0.20 | 0.20 | 0.07 | 0.05 | 0.05 | 0.07 | 0.07 | 0.07 |
| ZnO | 0.50 | 0.00 | 0.00 | 0.00 | 0.00 | 1.01 | 0.00 | 0.00 | 0.00 | 0.00 | 0.00 | 0.00 |
| ZrO$_2$ | 0.00 | 0.00 | 0.03 | 0.03 | 0.00 | 0.00 | 0.03 | 0.05 | 0.00 | 0.03 | 0.03 | 0.03 |
| Fe$_2$O$_3$ | 0.01 | 0.01 | 0.02 | 0.02 | 0.01 | 0.01 | 0.02 | 0.02 | 0.01 | 0.02 | 0.02 | 0.02 |
| Na$_2$O | 0.05 | 0.05 | 0.02 | 0.02 | 0.05 | 0.05 | 0.02 | 0.05 | 0.06 | 0.06 | 0.02 | 0.02 |
| Total | 99.98 | 100.00 | 100.03 | 100.04 | 99.97 | 99.97 | 99.99 | 99.57 | 99.99 | 99.96 | 99.58 | 100.03 |
| [RE$_2$O$_3$] | 2.16 | 3.60 | 2.38 | 2.38 | 3.25 | 1.80 | 2.37 | 3.60 | 3.04 | 2.36 | 2.29 | 2.37 |
| [RO] | 10.33 | 10.50 | 12.11 | 12.12 | 10.59 | 9.91 | 12.10 | 10.50 | 11.31 | 12.03 | 11.65 | 12.12 |
| [R'O] | 13.57 | 15.90 | 15.68 | 15.69 | 15.47 | 12.62 | 15.66 | 15.90 | 15.87 | 15.57 | 15.09 | 15.68 |
| [RO]/[Al$_2$O$_3$] | 0.75 | 0.72 | 0.88 | 0.88 | 0.74 | 0.73 | 0.88 | 0.72 | 0.78 | 0.88 | 0.88 | 0.88 |
| [R'O]/[Al$_2$O$_3$] | 0.99 | 1.09 | 1.14 | 1.14 | 1.08 | 0.93 | 1.14 | 1.10 | 1.09 | 1.14 | 1.14 | 1.14 |
| CTE ($\times 10^{-7}$ K$^{-1}$) | — | — | 37.6 | 37.8 | — | — | 37.8 | 38.1 | — | 37.1 | 36.5 | 38.7 |
| Strain Point (° C.) | 781 | 780 | 780 | 780 | 779 | 778 | 778 | 778 | 776 | 773 | 772 | 770 |
| Annealing Point (° C.) | 831 | 829 | 831 | 832 | 828 | 828 | 830 | 827 | 825 | 825 | 825 | 821 |
| Softening point (° C.) | 1066 | 1038 | 1050 | 1058 | 1031 | 1055 | 1054 | 1040 | 1040 | 1050 | 1049 | 1050 |
| Logη (liquidus) (Poise) | 5.66 | 5.52 | 5.11 | 5.06 | 5.65 | 5.45 | 5.16 | 5.47 | 5.57 | 5.34 | 5.13 | 5.15 |
| T2.3 (° C.) | 1646 | 1592 | 1633 | 1636 | 1602 | 1658 | 1628 | 1582 | 1591 | 1635 | 1641 | 1630 |
| T (liquidus) (° C.) | 1185 | 1175 | 1225 | 1230 | 1160 | 1215 | 1220 | 1170 | 1165 | 1205 | 1225 | 1220 |

TABLE II-continued

|  | Example No. | | | | | | | | | | | |
| --- | --- | --- | --- | --- | --- | --- | --- | --- | --- | --- | --- | --- |
|  | 13 | 14 | 15 | 16 | 17 | 18 | 19 | 20 | 21 | 22 | 23 | 24 |
| Density@20° C. (g·cm$^{-3}$) | 2.756 |  | 2.750 | 2.760 | 2.850 | 2.722 | 2.755 | 2.850 | 2.800 | 2.730 |  | 2.790 |
| Young's modulus (GPa) | 86.11 | 87.23 |  |  |  | 85.43 |  |  |  | 87.40 |  |  |

TABLE III

|  | Example No. | | | | | |
| --- | --- | --- | --- | --- | --- | --- |
|  | 25 | 26 | 27 | 28 | 29 | 30 |
| SiO$_2$ | 72.30 | 71.50 | 70.92 | 70.90 | 70.10 | 71.04 |
| Al$_2$O$_3$ | 13.40 | 13.60 | 14.22 | 13.60 | 14.20 | 14.57 |
| B$_2$O$_3$ | 0.00 | 0.50 | 1.10 | 0.00 | 1.02 | 0.99 |
| MgO | 3.09 | 3.22 | 2.25 | 3.14 | 3.29 | 2.75 |
| CaO | 4.58 | 4.81 | 4.38 | 4.65 | 5.00 | 4.44 |
| SrO | 1.22 | 1.26 | 0.59 | 1.23 | 0.78 | 0.31 |
| BaO | 2.93 | 2.63 | 3.11 | 2.97 | 2.91 | 3.00 |
| Y$_2$O$_3$ | 0.00 | 1.40 | 1.00 | 1.41 | 1.11 | 0.00 |
| La$_2$O$_3$ | 2.32 | 0.95 | 2.35 | 0.95 | 1.41 | 2.61 |
| SnO$_2$ | 0.07 | 0.06 | 0.00 | 0.07 | 0.05 | 0.20 |
| ZnO | 0.00 | 0.00 | 0.00 | 1.01 | 0.00 | 0.00 |
| ZrO$_2$ | 0.03 | 0.04 | 0.00 | 0.03 | 0.00 | 0.00 |
| Fe$_2$O$_3$ | 0.02 | 0.02 | 0.01 | 0.02 | 0.01 | 0.01 |
| Na$_2$O | 0.02 | 0.02 | 0.05 | 0.02 | 0.06 | 0.05 |
| Total | 99.98 | 100.01 | 99.98 | 100.00 | 99.94 | 99.97 |
| [RE$_2$O$_3$] | 2.32 | 2.35 | 3.35 | 2.36 | 2.52 | 2.61 |
| [RO] | 11.82 | 11.92 | 10.33 | 11.99 | 11.98 | 10.50 |
| [R'O] | 15.30 | 15.44 | 15.36 | 15.53 | 15.76 | 14.42 |
| [RO]/[Al$_2$O$_3$] | 0.88 | 0.88 | 0.73 | 0.88 | 0.84 | 0.72 |
| [R'O]/[Al$_2$O$_3$] | 1.14 | 1.14 | 1.08 | 1.14 | 1.11 | 0.99 |
| CTE (×10$^{-7}$ K$^{-1}$) | 38.3 | 36.9 | — | 38.3 | — | — |
| Strain Point (° C.) | 770 | 769 | 768 | 768 | 768 | 767 |
| Annealing Point (° C.) | 822 | 820 | 818 | 820 | 818 | 818 |
| Softening point (° C.) | 1050 | 1050 | 1032 | 1045 | 1040 | 1078 |
| Logη (liquidus) (Poise) | 5.11 | 5.06 | 5.78 | 5.02 | 5.48 | 5.43 |
| T2.3 (° C.) | 1642 | 1623 | 1598 | 1608 | 1601 | 1601 |
| T (liquidus) (° C.) | 1225 | 1225 | 1155 | 1220 | 1170 | 1180 |
| Density@20° C. (g·cm$^{-3}$) | 2.780 | 2.730 | 2.813 | 2.770 | 2.760 | 2.788 |
| Young's modulus (GPa) |  |  |  |  |  |  |

|  | 31 | 32 | 33 | 34 | 35 | 36 |
| --- | --- | --- | --- | --- | --- | --- |
| SiO$_2$ | 70.77 | 70.30 | 69.75 | 70.60 | 71.80 | 72.00 |
| Al$_2$O$_3$ | 14.11 | 13.50 | 13.08 | 13.60 | 13.20 | 13.80 |
| B$_2$O$_3$ | 1.46 | 0.82 | 1.99 | 1.39 | 0.50 | 0.50 |
| MgO | 2.10 | 3.81 | 4.27 | 3.13 | 3.55 | 3.17 |
| CaO | 4.38 | 4.85 | 5.21 | 4.63 | 4.72 | 4.71 |
| SrO | 0.69 | 0.80 | 1.43 | 1.21 | 1.37 | 1.24 |
| BaO | 3.15 | 3.31 | 2.75 | 2.96 | 2.84 | 2.99 |
| Y$_2$O$_3$ | 1.00 | 0.59 | 1.00 | 1.40 | 0.00 | 0.00 |
| La$_2$O$_3$ | 2.27 | 1.55 | 0.00 | 0.95 | 1.78 | 1.50 |
| SnO$_2$ | 0.00 | 0.10 | 0.00 | 0.07 | 0.10 | 0.07 |
| ZnO | 0.00 | 0.00 | 0.00 | 0.00 | 0.00 | 0.00 |
| ZrO$_2$ | 0.00 | 0.00 | 0.00 | 0.03 | 0.03 | 0.03 |
| Fe$_2$O$_3$ | 0.01 | 0.01 | 0.01 | 0.02 | 0.02 | 0.02 |
| Na$_2$O | 0.05 | 0.02 | 0.01 | 0.06 | 0.06 | 0.02 |
| Total | 99.97 | 99.66 | 99.50 | 100.05 | 99.97 | 100.05 |
| [RE$_2$O$_3$] | 3.26 | 2.14 | 1.00 | 2.35 | 1.78 | 1.50 |
| [RO] | 10.32 | 12.77 | 13.66 | 11.93 | 12.48 | 12.11 |
| [R'O] | 15.21 | 15.98 | 15.16 | 15.45 | 15.15 | 14.36 |
| [RO]/[Al$_2$O$_3$] | 0.73 | 0.95 | 1.04 | 0.88 | 0.95 | 0.88 |
| [R'O]/[Al$_2$O$_3$] | 1.08 | 1.18 | 1.16 | 1.14 | 1.15 | 1.04 |
| CTE (×10$^{-7}$ K$^{-1}$) | — | — | 37.1 | 37.0 | 36.5 | — |
| Strain Point (° C.) | 765 | 764 | 763 | 762 | 762 | 762 |
| Annealing Point (° C.) | 815 | 814 | 808 | 814 | 815 | 815 |
| Softening point (° C.) | 1031 | 1030 | 1011 | 1040 | 1050 | 1050 |
| Logη (liquidus) (Poise) | 5.68 | 5.64 | 5.20 | 5.37 | 5.36 | 5.21 |
| T2.3 (° C.) | 1598 | 1617 | 1629 | 1624 | 1653 | 1653 |

TABLE III-continued

| | | | | | | |
|---|---|---|---|---|---|---|
| T (liquidus) (° C.) | 1160 | 1165 | 1200 | 1190 | 1205 | 1220 |
| Density@20° C. (g · cm$^{-3}$) | 2.806 | 2.760 | | 2.730 | 2.720 | 2.720 |
| Young's modulus (GPa) | | | | 86.20 | | |

TABLE IV

| | Example No. | | | | | | | | | | | |
|---|---|---|---|---|---|---|---|---|---|---|---|---|
| | 37 | 38 | 39 | 40 | 41 | 42 | 43 | 44 | 45 | 46 | 47 | 48 |
| SiO$_2$ | 70.90 | 69.91 | 69.39 | 70.80 | 71.60 | 69.87 | 69.80 | 70.60 | 69.76 | 71.60 | 69.90 | 70.36 |
| Al$_2$O$_3$ | 13.60 | 14.07 | 13.48 | 13.50 | 13.70 | 13.48 | 13.90 | 13.40 | 13.08 | 13.80 | 13.50 | 13.33 |
| B$_2$O$_3$ | 1.00 | 1.69 | 3.63 | 1.00 | 0.98 | 3.62 | 1.53 | 0.81 | 2.48 | 0.70 | 3.62 | 3.61 |
| MgO | 3.13 | 3.04 | 1.62 | 3.61 | 3.32 | 1.13 | 3.63 | 3.76 | 4.28 | 3.15 | 1.12 | 1.14 |
| CaO | 4.65 | 3.62 | 4.31 | 4.83 | 4.42 | 4.32 | 5.15 | 4.80 | 4.99 | 4.71 | 4.30 | 4.22 |
| SrO | 1.23 | 0.95 | 1.25 | 1.40 | 1.28 | 1.25 | 1.03 | 0.79 | 1.64 | 1.24 | 1.25 | 1.25 |
| BaO | 2.97 | 3.05 | 3.40 | 2.90 | 2.66 | 3.40 | 2.83 | 3.28 | 2.75 | 2.99 | 3.40 | 3.32 |
| Y$_2$O$_3$ | 1.41 | 0.00 | 1.99 | 1.25 | 0.00 | 2.00 | 1.07 | 0.59 | 1.00 | 0.00 | 0.99 | 2.68 |
| La$_2$O$_3$ | 0.95 | 3.60 | 0.76 | 0.58 | 1.79 | 0.76 | 0.95 | 1.53 | 0.00 | 1.67 | 1.75 | 0.00 |
| SnO$_2$ | 0.07 | 0.00 | 0.05 | 0.07 | 0.10 | 0.05 | 0.05 | 0.10 | 0.00 | 0.07 | 0.05 | 0.00 |
| ZnO | 0.00 | 0.00 | 0.00 | 0.00 | 0.00 | 0.00 | 0.00 | 0.00 | 0.00 | 0.00 | 0.00 | 0.00 |
| ZrO$_2$ | 0.03 | 0.00 | 0.05 | 0.03 | 0.03 | 0.05 | 0.00 | 0.00 | 0.00 | 0.03 | 0.05 | 0.00 |
| Fe$_2$O$_3$ | 0.02 | 0.01 | 0.02 | 0.02 | 0.02 | 0.02 | 0.01 | 0.01 | 0.01 | 0.02 | 0.02 | 0.01 |
| Na$_2$O | 0.02 | 0.05 | 0.05 | 0.06 | 0.06 | 0.05 | 0.06 | 0.02 | 0.01 | 0.02 | 0.05 | 0.06 |
| Total | 99.97 | 100.00 | 99.99 | 100.05 | 99.96 | 99.99 | 100.01 | 99.68 | 100.00 | 100.00 | 100.00 | 100.00 |
| [RE$_2$O$_3$] | 2.36 | 3.60 | 2.75 | 1.83 | 1.79 | 2.75 | 2.02 | 2.12 | 1.00 | 1.67 | 2.74 | 2.68 |
| [RO] | 11.98 | 10.67 | 10.58 | 12.74 | 11.68 | 10.10 | 12.64 | 12.63 | 13.66 | 12.09 | 10.07 | 9.94 |
| [R'O] | 15.52 | 16.07 | 14.70 | 15.49 | 14.37 | 14.22 | 15.67 | 15.80 | 15.16 | 14.60 | 14.19 | 13.97 |
| [RO]/[Al$_2$O$_3$] | 0.88 | 0.76 | 0.78 | 0.94 | 0.85 | 0.75 | 0.91 | 0.94 | 1.04 | 0.88 | 0.75 | 0.75 |
| [R'O]/[Al$_2$O$_3$] | 1.14 | 1.14 | 1.09 | 1.15 | 1.05 | 1.06 | 1.13 | 1.18 | 1.16 | 1.06 | 1.05 | 1.05 |
| CTE (×10$^{-7}$ K$^{-1}$) | 37.7 | 39.3 | 37.0 | 36.7 | 36.0 | 37.1 | — | — | 36.3 | — | 37.6 | — |
| Strain Point (° C.) | 761 | 761 | 761 | 760 | 760 | 760 | 759 | 758 | 757 | 755 | 755 | 754 |
| Annealing Point (° C.) | 814 | 805 | 806 | 813 | 814 | 805 | 809 | 808 | 804 | 808 | 800 | 806 |
| Softening point (° C.) | 1040 | 1020 | 1027 | 1040 | 1044 | 1032 | 1030 | 1030 | 1030 | 1040 | 1020 | 1050 |
| Logη (liquidus) (Poise) | 5.24 | 5.84 | 5.51 | 5.41 | 5.35 | 5.52 | 5.15 | 5.62 | 5.56 | 5.12 | 5.72 | 5.28 |
| T2.3 (° C.) | 1616 | 1569 | 1606 | 1621 | 1661 | 1605 | 1607 | 1607 | 1633 | 1644 | 1602 | 1609 |
| T (liquidus) (° C.) | 1200 | 1125 | 1165 | 1185 | 1205 | 1170 | 1190 | 1160 | 1170 | 1220 | 1150 | 1190 |
| Density@20° C. (g · cm$^{-3}$) | 2.740 | | | 2.700 | 2.710 | | 2.720 | 2.760 | | 2.730 | | |
| Young's modulus (GPa) | | 86.37 | 84.07 | | 83.93 | | | | | | 82.80 | 83.09 |

TABLE V

| | Example No. | | | | | | | | | | |
|---|---|---|---|---|---|---|---|---|---|---|---|
| | 49 | 50 | 51 | 52 | 53 | 54 | 55 | 56 | 57 | 58 | 59 |
| SiO$_2$ | 71.30 | 69.80 | 69.90 | 69.90 | 70.77 | 70.38 | 70.99 | 69.75 | 71.86 | 71.03 | 70.68 |
| Al$_2$O$_3$ | 13.20 | 13.20 | 13.50 | 13.40 | 13.18 | 13.33 | 12.64 | 13.08 | 12.57 | 11.88 | 11.82 |
| B$_2$O$_3$ | 0.98 | 1.24 | 3.61 | 2.28 | 2.53 | 3.61 | 1.30 | 2.48 | 0.00 | 0.00 | 0.00 |
| MgO | 3.53 | 4.36 | 1.13 | 3.09 | 2.25 | 1.13 | 3.73 | 4.27 | 4.69 | 6.48 | 6.44 |
| CaO | 4.72 | 5.10 | 4.30 | 4.59 | 4.20 | 4.23 | 5.24 | 5.23 | 5.76 | 5.55 | 5.52 |
| SrO | 1.37 | 1.04 | 1.25 | 1.21 | 1.18 | 1.25 | 2.28 | 1.42 | 4.00 | 3.19 | 3.18 |
| BaO | 2.84 | 3.49 | 3.40 | 2.93 | 3.42 | 3.33 | 2.25 | 2.75 | 0.00 | 1.26 | 1.26 |
| Y$_2$O$_3$ | 0.00 | 0.39 | 0.50 | 1.39 | 0.00 | 2.00 | 1.00 | 1.00 | 0.00 | 0.00 | 0.00 |
| La$_2$O$_3$ | 1.79 | 1.03 | 2.25 | 0.94 | 2.41 | 0.69 | 0.00 | 0.00 | 1.00 | 0.50 | 1.00 |
| SnO$_2$ | 0.10 | 0.10 | 0.05 | 0.07 | 0.00 | 0.00 | 0.07 | 0.00 | 0.11 | 0.10 | 0.10 |
| ZnO | 0.00 | 0.00 | 0.00 | 0.00 | 0.00 | 0.00 | 0.00 | 0.00 | 0.00 | 0.00 | 0.00 |
| ZrO$_2$ | 0.03 | 0.00 | 0.05 | 0.03 | 0.00 | 0.00 | 0.03 | 0.00 | 0.00 | 0.00 | 0.00 |
| Fe$_2$O$_3$ | 0.02 | 0.01 | 0.02 | 0.02 | 0.01 | 0.01 | 0.02 | 0.01 | 0.00 | 0.00 | 0.00 |
| Na$_2$O | 0.06 | 0.02 | 0.05 | 0.06 | 0.05 | 0.05 | 0.02 | 0.01 | 0.00 | 0.00 | 0.00 |
| Total | 99.94 | 99.78 | 100.01 | 99.91 | 100.00 | 100.00 | 99.56 | 100.00 | 100.00 | 100.00 | 100.00 |
| [RE$_2$O$_3$] | 1.79 | 1.42 | 2.75 | 2.33 | 2.41 | 2.69 | 1.00 | 1.00 | 1.00 | 0.50 | 1.00 |
| [RO] | 12.46 | 13.99 | 10.08 | 11.82 | 11.05 | 9.94 | 13.49 | 13.67 | 14.45 | 16.49 | 16.40 |
| [R'O] | 15.15 | 16.13 | 14.20 | 15.31 | 14.66 | 13.96 | 14.99 | 15.17 | 15.95 | 17.23 | 17.90 |
| [RO]/[Al$_2$O$_3$] | 0.94 | 1.06 | 0.75 | 0.88 | 0.84 | 0.75 | 1.07 | 1.05 | 1.15 | 1.39 | 1.39 |
| [R'O]/[Al$_2$O$_3$] | 1.15 | 1.22 | 1.05 | 1.14 | 1.11 | 1.05 | 1.19 | 1.16 | 1.27 | 1.45 | 1.51 |
| CTE (×10$^{-7}$ K$^{-1}$) | 36.9 | — | 38.1 | 37.1 | 42.5 | — | 36.5 | 36.1 | 36.1 | 37.6 | 38.5 |
| Strain Point (° C.) | 754 | 753 | 752 | 751 | 751 | 751 | 750 | 750 | 771 | 751 | 747 |

TABLE V-continued

| | Example No. | | | | | | | | | |
|---|---|---|---|---|---|---|---|---|---|---|
| | 49 | 50 | 51 | 52 | 53 | 54 | 55 | 56 | 57 | 58 | 59 |
| Annealing Point (° C.) | 807 | 804 | 796 | 804 | 795 | 803 | 804 | 795 | 812 | 801 | 796 |
| Softening point (° C.) | 1040 | 1020 | 1023 | 1030 | 1019 | 1032 | 1035 | 1021 | 1046 | 1028 | 1020 |
| Logη (liquidus) (Poise) | 5.43 | 5.65 | 5.69 | 5.35 | 5.92 | 5.57 | 5.14 | 5.55 | 4.78 | 4.99 | 4.98 |
| T2.3 (° C.) | 1647 | 1623 | 1605 | 1614 | 1609 | 1611 | 1635 | 1631 | 1650 | 1660 | 1640 |
| T (liquidus) (° C.) | 1190 | 1160 | 1150 | 1185 | 1130 | 1170 | 1215 | 1170 | 1245 | 1220 | 1020 |
| Density@20° C. (g·cm$^{-3}$) | 2.720 | 2.720 | | 2.720 | | | | | 2.63 | 2.63 | 2.68 |
| Young's modulus (GPa) | | | 82.30 | 85.60 | 83.05 | 83.29 | | | | | |

What is claimed is:

1. A rare-earth-containing glass material having a composition, expressed in mole percentages on an oxide basis, comprising:
   $SiO_2$: 66-75
   $Al_2O_3$: 11-17
   MgO: 1-6.5
   CaO: 2-7
   SrO: 0-4
   BaO: 0-4
   $Y_2O_3$: 0-4
   $La_2O_3$: 0-4
   $Y_2O_3+La_2O_3$: 0.1-4
   wherein the glass material has:
      (i) a strain point that is equal to or greater than 750°; and
      (ii) a $B_2O_3$ content which is essentially zero.

2. A glass material according to claim 1, comprising at most 3 mol % of $RE_2O_3$, where $RE_2O_3$ represents the rare earth oxides in the glass material including the amounts of $Y_2O_3$ and/or $La_2O_3$.

3. A glass material according to claim 1, which is essentially free of BaO.

4. A glass material according to claim 1, comprising 1-4 mol % of BaO.

5. A glass material according to claim 1, which is essentially free of $As_2O_3$ and $Sb_2O_3$.

6. A glass material according to claim 1 having at least one of the following compositional characteristics:
   (i) up to 2 mol % $TiO_2$; and/or
   (ii) up to 3 mol % ZnO.

7. A glass material according to claim 1, comprising ZnO and $B_2O_3$, in total, from 0 to 4 mol %.

8. A glass material according to claim 1, having a [R'O]/[$Al_2O_3$] ratio from 0.75 to 1.8, where [$Al_2O_3$] is the mole percent of $Al_2O_3$ and [R'O] equals [RO]+1.5[$RE_2O_3$], where [RO] is the sum of the mole percents of MgO, CaO, SrO, and BaO, and [$RE_2O_3$] is the sum of the mole percents of rare earth oxides including $Y_2O_3$ and/or $La_2O_3$ in the glass material.

9. A glass material according to claim 1, having an annealing point of higher than 790° C.

10. A glass material according to claim 1, having a T2.3 lower than 1680° C., where T2.3 is the temperature at which a homogeneous composition of the glass material has a viscosity of 200 poise.

11. A glass material according to claim 1, having a density lower than 3.2 gm/cm$^3$.

12. A glass material according to claim 1, having a liquidus temperature lower than 1250° C.

13. A glass material according to claim 1, having a liquidus viscosity greater than 60 kPoise.

14. A glass substrate for TFT liquid crystal display, photovoltaic or other opto-electric devices, comprising a glass material according to claim 1.

15. A glass substrate according to claim 14 made by a down-draw process such as a fusion down-draw process, or a slot down-draw process.

16. A device comprising a substrate comprising a glass material according to claim 1.

17. A device according to claim 16, comprising a thin film of polycrystalline or single-crystalline semiconductor material or a semiconductor device made thereof, formed over a surface of the substrate.

18. A device according to claim 16, comprising a layer of a material differing from the glass material, such as a semiconductor material, formed by a process including a step at a temperature higher than 350° C.

19. A process for making a glass material according to claim 1, comprising:
   (i) providing a batch mixture comprising source materials that upon melting transforms into a glass melt having a composition corresponding to the glass material;
   (ii) melting the batch mixture to obtain a fluid glass; and
   (iii) forming a glass sheet from the fluid glass via a down-draw process.

20. A process according to claim 19, wherein: in step (iii), the down-draw process comprises a fusion process.

21. A process according to claim 19, wherein subsequent to step (iii) but prior to the end use of the glass sheet:
   the as-formed glass sheet is not subjected to a heat treatment at a temperature around or higher than the annealing point thereof.

22. A rare-earth-containing glass material having a composition, expressed in mole percentages on an oxide basis, comprising:
   $SiO_2$: 66-75
   $Al_2O_3$: 11-17
   $B_2O_3$: 0-4
   MgO: 1-6.5
   CaO: 2-7
   SrO: 0-4
   BaO: 0-4
   $Y_2O_3$: 0-4
   $La_2O_3$: 0-4
   $Y_2O_3+La_2O_3$: 0.1-4
   wherein the glass material has:
      (i) a strain point that is equal to or greater than 750°; and
      (ii) an annealing point of higher than 790° C. and a T2.3 lower than 1580° C., where T2.3 is the temperature at which a homogeneous composition of the glass material has a viscosity of 200 poise.

* * * * *